(12) United States Patent
Jensen et al.

(10) Patent No.: US 10,346,672 B2
(45) Date of Patent: Jul. 9, 2019

(54) FINGERPRINT READER

(71) Applicants: Eric Dean Jensen, Irvine, CA (US); William R Crumly, Anaheim, CA (US)

(72) Inventors: Eric Dean Jensen, Irvine, CA (US); William R Crumly, Anaheim, CA (US)

(*) Notice: Subject to any disclaimer, the term of this patent is extended or adjusted under 35 U.S.C. 154(b) by 0 days.

(21) Appl. No.: 15/359,933

(22) Filed: Nov. 23, 2016

(65) Prior Publication Data

US 2017/0147865 A1 May 25, 2017

Related U.S. Application Data

(60) Provisional application No. 62/258,863, filed on Nov. 23, 2015.

(51) Int. Cl.
*G06K 9/28* (2006.01)
*G06K 9/00* (2006.01)
*G06K 9/20* (2006.01)

(52) U.S. Cl.
CPC ..... *G06K 9/00087* (2013.01); *G06K 9/00046* (2013.01); *G06K 9/00053* (2013.01); *G06K 9/2027* (2013.01)

(58) Field of Classification Search
CPC .................. G06K 9/00013–2009/0006; G06K 9/0004–9/00046
See application file for complete search history.

(56) References Cited

U.S. PATENT DOCUMENTS 4,484,179 A 11/1984 Kasday
4,553,837 A 11/1985 Marcus
(Continued)

FOREIGN PATENT DOCUMENTS

TW 594332 B 6/2004
TW 201120763 A 6/2011
(Continued)

OTHER PUBLICATIONS

Jain A.K. et al., An identity-authentication system using fingerprints, Proc. of the IEEE, 85 (9) pp. 1365-1388, Sep. 1997.
(Continued)

*Primary Examiner* — Brian Werner
(74) *Attorney, Agent, or Firm* — Welsh Flaxman & Gitler LLC

(57) ABSTRACT

A fingerprint reader includes a display screen composed of an array of energy emitting pixels covered by a transparent cover, at least one sensor coupled along an edge of the display screen, a display driver directing the array of energy emitting pixels of the display screen to illuminate in a predetermined sequence, and a microprocessor in communication with the display driver and the at least one sensor. The microprocessor knows the location of the energy emitting pixel being illuminated and the specific time at which the illumination occurs. In use, and when at least one finger is placed on the transparent cover and the display driver is activated, energy from each energy emitting pixel sequentially illuminated is reflected off the fingerprint to the at least one sensor. The energy received at the at least one sensor is at different intensity levels depending upon the ridges and valleys of the at least one fingerprint. The at least one sensor sends a signal to the microprocessor regarding the energy intensity level, from which the microprocessor creates a fingerprint image as the energy emit emitting pixels are sequentially illuminated.

1 Claim, 26 Drawing Sheets

(56) References Cited

U.S. PATENT DOCUMENTS

| | | | | |
|---|---|---|---|---|
| 5,991,431 A | * | 11/1999 | Borza | G01B 11/24 |
| | | | | 345/164 |
| 6,049,620 A | * | 4/2000 | Dickinson | G01B 7/004 |
| | | | | 382/108 |
| 6,259,804 B1 | | 7/2001 | Setlak et al. | |
| 6,941,002 B1 | * | 9/2005 | Kawahara | G06K 9/0004 |
| | | | | 382/124 |
| 2002/0054394 A1 | | 5/2002 | Sasaki et al. | |
| 2003/0156230 A1 | | 8/2003 | Boer et al. | |
| 2004/0233321 A1 | * | 11/2004 | Jung | H04N 5/2351 |
| | | | | 348/362 |
| 2012/0206586 A1 | | 8/2012 | Gardner | |
| 2013/0258086 A1 | * | 10/2013 | Erhart | H04N 5/23219 |
| | | | | 348/77 |
| 2015/0036065 A1 | | 2/2015 | Yousefpor et al. | |
| 2015/0116107 A1 | | 4/2015 | Fadell et al. | |
| 2015/0177884 A1 | * | 6/2015 | Han | G06F 3/044 |
| | | | | 345/174 |
| 2015/0178542 A1 | | 6/2015 | Minteer et al. | |
| 2015/0254940 A1 | | 9/2015 | Graef et al. | |
| 2016/0283772 A1 | * | 9/2016 | Nelson | G06F 3/0421 |

FOREIGN PATENT DOCUMENTS

| | | |
|---|---|---|
| TW | M498326 U | 4/2015 |
| TW | M511536 U | 11/2015 |

OTHER PUBLICATIONS

Watson C. et al., Fingerprint Vendor Technology Evaluation—Evaluation of Fingerprint Matching Algorithms, NISTIR 8034, 233 pgs, Dec. 18, 2014.

* cited by examiner

FINGERPRINT READER

CROSS REFERENCE TO RELATED APPLICATION

This application claims the benefit of U.S. Provisional Patent Application Ser. No. 62/258,863, entitled "REMOTE SENSING FINGERPRINT READER FOR OPERATION ON DIGITAL DISPLAY SCREENS," filed Nov. 23, 2015.

BACKGROUND OF THE INVENTION

1. Field of the Invention

The present invention relates to a display screen allowing for recordation of a fingerprint placed anywhere on the display screen, and a method to record a fingerprint anywhere on a display screen without affecting the display function. The present invention enables a cellphone to read a fingerprint when it is placed anywhere on the display screen. A cellphone maker no longer needs to allocate space on the front or back of the cellphone for a discrete fingerprint reading device.

2. Description of the Related Art

Identification is important issue in our digital, fast moving world. The problem lies in how to securely identify people. Credit cards can be lost or stolen. Picture identification cards suffer from inattention by the people that guard the door. Several years ago a top secret facility had several of the employees replace the pictures on their badge with cartoon characters (Micky Mouse, Daffy Duck etc.) who then successfully entered the top secret facility for several days. The fundamental issue is to assure that the identification card or credit card actually belongs to the person representing themselves to make a purchase or to gain entry.

Fingerprints have been used for identification through much of recorded history. They are found on Babylonian clay tablets, on the walls of Egyptian tombs, on Minoan, Greek, and Chinese pottery, as well as on tiles from ancient Rome. Many of these fingerprints were likely deposited unintentionally, some are decorations, but researchers believe that some fingerprints found on pottery were impressed so deeply and deliberately that they were meant to uniquely identify the artist or owner.

Several different styles and types of fingerprint readers exist, but all share the same goal, that is, to accurately record the unique features defined by the friction ridges (and valleys) on the finger. Fingerprints are identified by three levels of features. The flow of the ridges (Level-1) is generally classified as an arch, loop, or whorl. Level-2 features describe significant changes along individual friction ridges—primarily bifurcations and endings. These Level-2 features are referred to as minutiae and are the primary means of identification in current implementations. Features present within and between the friction ridges are referred to as Level-3 features. Level-3 features include pores, scars, width changes, shape changes, creases, breaks, etc.

A modern fingerprint sensor is an electronic device used to capture a digital representation of a fingerprint, that is, a fingerprint image. Many competing technologies exist for collecting fingerprint images—pressure sensors, capacitive sensors, optical sensors, and thermal sensors, to name a few. While the "raw" captured fingerprint image can be stored for general pattern matching, it is common to digitally process the raw fingerprint image and create a more efficient biometric template (a collection of extracted features) which is stored and used for matching. Whatever physical properties are used to capture the fingerprint image, it is critical to collect a high-quality (clarity & contrast) image of the fingerprint because the image quality is highly correlated to overall fingerprint system performance (see NIST 8034 Fingerprint Vendor Technology Evaluation [FpVTE2012]).

If the goal is to sense a fingerprint placed anywhere on a display screen, then a buried sensor array must exist across the entire display screen, and the costs and complexities are high. The most commonly used sensing technology is currently capacitive, and sensing electrical charges is most effective when the sensor array is located very close to the surface of the splay screen. This drives unrealistic material thicknesses and puts the sensor array in front of the LEDs and interferes with the display function.

Direct axial/optical solutions solve issues involving close proximity to the screen, but retain the need for a large, high-density sensor array, and also require micro-lensing and increased thickness. They must see "through" the regular illuminating layers of the display so that requires special materials with unique optical and electrical properties to be used in various layers throughout the display.

Optical fingerprint imaging involves capturing a digital image of the print using visible, UV, or Infrared light. This type of sensor is, in essence, a specialized digital camera. In most implementations, the sensor is built with a clear touch plate onto which the finger is pressed. Under the touch plate, a light source and a camera sensor are arranged strategically with various optical elements to focus a clear, high-contrast image upon the camera sensor.

The procedure used by all modern fingerprint scanners to capture a fingerprint using a sensor entails sliding, rolling, or touching the finger on a sensing area which, according to the physical principle in use (in this case, optical), captures the difference between valleys and ridges. It is important that the optical elements of the image capture de-vice preserve a clear, accurate, and high contrast representation of the fingerprint to achieve a high signal-to-noise ratio (S/N). One physical phenomenon often used in optical fingerprint readers to increase contrast and S/N ratio is Total Internal Reflection (TIR)—and an ancillary property—Frustrated Total Internal Reflection (FTIR).

Total Internal Reflection is an optical phenomenon that occurs when a ray of light strikes a boundary at an angle larger than a particular critical angle with respect to the normal to the surface. If the refractive index is lower on the other side of the boundary and the incident angle is greater than the critical angle, and all of the light is reflected back into the original medium. This can only occur where light travels from a medium with a higher [n1=higher refractive index] to one with a lower refractive index [n2=lower refractive index]. For example, it will occur when passing from glass to air, but not when passing from air to glass. The Critical Angle is the angle of incidence above which total internal reflection occurs. The angle of incidence is measured with respect to the normal at the refractive boundary.

An important side effect of total internal reflection is the propagation of an evanescent wave across the boundary surface. In TIR conditions, although the entire incident wave is reflected back into the originating medium, there is some penetration into the second medium at the boundary. This wave in the optically less dense medium is known as the evanescent wave.

If a third medium with a higher refractive index than the low-index second medium is placed close to the interface between the first medium and the second medium, the evanescent wave will pass energy across the second into the third medium. This process is called "Frustrated" Total Internal Reflection (FTIR). The FTIR phenomenon occurs only when the spacing between the two higher index media is small (on the order of 10s of nanometers). The dimensions of the ridges and valleys in a fingerprint are larger than the spacing necessary for the interaction that creates FTIR. Thus, as a finger approaches and touches a glass plate, light is absorbed and re-radiated in all directions where the friction ridges touch the glass, but where the valleys have a few tenths of a millimeter above the glass, all light rays that strike the surface of the touch plate above the critical angle are reflected.

When the touch area is viewed below the glass (or other transparent cover) of the display screen, the areas where the ridges touch the glass are one color and intensity, and the valleys are another. The ridges can appear dramatically lighter or darker than the valleys depending on the orientation of the light source and the viewing angle. In either case, this resultant high-contrast image is ideal for the typical digital-camera-based optical finger-print readers.

A simple, common characteristic of most fingerprint sensors, whatever the method of operation, is that the finger must contact with the sensor device directly. For the cellphone, application in particular this is a significant disadvantage because cellphone users prefer to use a fingerprint reader on the same surface that they view (the screen side). Users also prefer large viewing areas. However, all current "screen side" cellphone fingerprint reader solutions require space on the face of the cellphone exclusively for the fingerprint sensor.

In addition, there is a strong user and manufacturer preference to have a uniform cover glass over the entire face of the cellphone. In fact, some cellphone designers are attempting to encapsulate the entire surface of the cellphone in glass. The strength, scratch resistance and stiffness of the glass make it an advantageous surface material.

However, because all current fingerprint sensors (which are appropriately sized for use in cellphones) must be in direct contact with the finger, the cover glass must have a hole for the sensor to fit. The hole adds cost, presents a perimeter that must be sealed from the environment, and creates an area of weakness in the glass. Cellphone manufacturers are seeking a fingerprint sensor technology that can be placed under the cover-glass to avoid creating the hole.

An alternative approach is to scan the illumination and direct the resulting reflected light to a sensor. The power detected by the sensor can then be used to recreate the image by scanning a display screen and changing the intensity of the display to reflect the power detected by the sensor. This technology is commonly used in the scanning electron microscope and many confocal microscope designs because the image is free of distortions caused by focusing the image, the point of view of the image is from the illumination source and the depth of field is enormous compared to other imaging techniques. Relative to fingerprints, this method of creating a fingerprint image was used in U.S. Pat. No. 4,553,837, entitled "ROLL FINGERPRINT PROCESSING APPARATUS," by Daniel H. Marcus in 1983.

Another optical system for scanning a fingerprint is disclosed in Taiwan Patent Application 104208311. The '311 application discloses a system wherein the finger s illuminated from below the sensor and the image is projected onto a camera chip adjacent to the sensor. FTIR is used to enhance the image of the ridges so that the ridges are bright and the valleys are dark. If the sensor is optically connected to the cover-glass of a cellphone (by bonding to the cover-glass using optically clear adhesive with a matching index of refraction for instance) the glass becomes part of the sensor. Electronically, this invention focuses the image onto a digital camera, and the sensor pixels on the camera chip are scanned to create the digital image. The resultant image can be processed to remove distortions and identify the minutia in order to determine a positive identification of the fingerprint. The point of view of the image will appear as if viewed from the left. The image is naturally compressed along the length of the arrow but is full size in the third dimension. Care must be taken with the optics to ensure that the camera chip is maximally utilized. Even then, the image resolution in pixels per inch may not be symmetrical. The image distortions are geometry related and can be corrected to some extent software, but the resultant image is unlikely to be fully corrected and will not have a true one-to-one relationship to the original fingerprint. Also, manufacturing tolerances limit how thin the structure can be made.

Attempts to solve problems associated with sensing fingerprints through a display screen of, for example, a cellphone involve substantial changes to the core display materials. Many of these materials are expensive and capital intensive. The additional layers increase the thickness of the devices. The straightforward approach requires that density arrays of sensors be placed across the screen.

U.S. Patent Application Publication No. 2015/0036065 discloses using a layer of sensors under the display to allow fingerprints to be read all across the display without screwing up the way the phone looks when you're using it. This published application describes adding a layer "under" the display to read the fingerprint. This is different from the common approach used by most team working to find a way to take a fingerprint from the screen. Most teams are trying to find a way to add a layer "above" the display LED/LCD layers so the sensors can be very close to the finger. The trick is to make that layer completely transparent so the image from the display is not corrupted. That's been difficult to achieve.

With regard to early art on using the display to illuminate the fingerprint for reading, Apple has attempted to use the pixels in the display as "sensing pixels", See U.S. Patent Application Publication No. 2015/0178542, entitled "Finger biometric sensor including drive signal level updating and related methods."

U.S. Patent Application Publication No. 2015/0036065, entitled "Fingerprint Sensor in an Electronic Device" discloses sensing fingerprints directly on the screen from multiple fingers and mentions ultra-sonic sensing. While the ultra-sonic concept is only thing out there that is even remotely close to the present invention it is not very close except it likely doesn't require physical sensors to correspond 1-to-1 with the detail desired in the fingerprint image.

Still further, the size of the fingerprint sensor used on cellphones is determined by a trade-off of increasing reliability (which requires large sensing area) and decreasing cost (which increases with sensing area). Present sensors on cellphones are as small as possible while still providing sufficient reliability as required by the cellphone users, which is relatively low. However, in order to provide sufficient security for significant financial transactions the cellphone fingerprint sensor reliability will have to be at least as reliable as the identification chip system being introduced in credit cards. This will require significantly larger fingerprint sensor size—area that is simply not available on cellphones. By having the entire screen available to be a fingerprint sensor there is no longer a practical restriction on the size of the fingerprint sensor.

With the foregoing in mind, there are no existing full-screen fingerprint solutions at this time. All known potential solutions involve adding materials or layers to the display stack and they include thousands or millions of microsensors to measure the details of the fingerprint. The present invention avoids a issues of the prior art by dramatically reducing the number of sensors required and optionally allowing the sensor elements to be relocated from the area of the display to the perimeter and utilizing sequential energy pulses and accurate timing to build a fingerprint image. The device has the ability to scan the entire screen to detect the location of a finger in contact of the screen and measure the intricate features of a fingerprint. Through the remainder of this application, this system is referred to as the remote sensing fingerprint reader.

SUMMARY OF THE INVENTION

It is, therefore, an object of the present invention to provide a fingerprint reader including a display screen composed of an array of energy emitting pixels covered by a transparent cover, at least one sensor coupled along an edge of the display screen, a display driver directing the array of energy emitting pixels of the display screen to illuminate in a predetermined sequence, and a microprocessor in communication with the display driver and the at least one sensor. The microprocessor knows the location of the energy emitting pixel being illuminated and the specific time at which the illumination occurs. In use, and when at least one finger is placed on the transparent cover and the display driver is activated, energy from each energy emitting pixel sequentially illuminated is reflected off the fingerprint to the at least one sensor. The energy received at the at least one sensor is at different intensity levels depending upon the ridges and valleys of the at least one fingerprint. The at least one sensor sends a signal to the microprocessor regarding the energy intensity level, from which the microprocessor creates a fingerprint image as the energy emitting pixels are sequentially illuminated.

It is also an object of the present invention to provide a fingerprint reader including a memory for storing the fingerprint image created by the microprocessor.

It is another object of the present invention to provide a fingerprint reader including an A/D converter positioned between the at least one sensor and the microprocessor for converting analog signals generated by the at least one sensor to digital signals used by the microprocessor.

It is a further object of the present invention to provide a fingerprint reader wherein the transparent cover is glass.

It is also an object of the present invention to provide a fingerprint reader wherein the at least one sensor is a photo-sensor measuring energy intensity levels from the array of energy emitting pixels.

It is another object of the present invention to provide a fingerprint reader wherein the transparent cover is flat.

It is a further object of the present invention to provide a fingerprint reader wherein the transparent cover is curved.

It is also an object of the present invention to provide a fingerprint reader including an energy directing structure in which the photo-sensor is positioned, the energy directing structure being positioned in a surface of the transparent cover and including optics allowing for reflection of energy coming from the display screen to the photo-sensor.

It is a further object of the present invention to provide a fingerprint reader wherein the at least one sensor includes a plurality of sensors located at edges of the transparent cover.

It is also an object of the present invention to provide a fingerprint reader including a touch sensor used to locate placement of the at least one finger on the transparent cover.

It is another object of the present invention to provide a fingerprint reader including lenses or occlusion features to facilitate optimal illumination of the at least one finger.

It is a further object of the present invention to provide fingerprint reader wherein energy received at the at least sensor is filtered to prevent unwanted energy from entering the at least one sensor.

It is also an object of the present invention to provide a fingerprint reader wherein the energy is filtered based on the timing of light received at the at least one sensor from the illuminated energy emitting pixel.

It is another object of the present invention to provide a fingerprint reader wherein the array of energy emitting pixels is contained in a layer that is made reflective in the frequencies of interest to fingerprint detection.

It is a further an object of the present invention to provide a fingerprint reader wherein several neighboring energy emitting pixels are illuminated together as a group.

It is also an object of the present invention to provide a fingerprint reader wherein the energy emitting pixels in areas of the display screen not used for the fingerprint reading are turned off when the fingerprint reader is active.

It is another object of the present invention to provide a fingerprint reader wherein each energy emitting pixel is illuminated multiple times to create a time-averaged fingerprint image.

It is a further an object of the present invention to provide a fingerprint reader wherein the color of the energy received at the at least one sensor can be measured and included in the signal sent to the microprocessor.

It is also an object of the present invention to provide a reader including a screen composed of an array of energy emitting pixels covered by a transparent cover, at least one sensor coupled along an edge of the screen, a driver directing the array of energy emitting pixels of the screen to illuminate in a sequence, and a microprocessor in communication with the driver and the at least one sensor, wherein the microprocessor knows the location of the energy emitting pixel being illuminated and the specific time at which the illumination occurs. When at least one finger is placed on the transparent cover and the driver is activated, energy from each energy emitting pixel sequentially illuminated is reflected off the fingerprint to the at least one sensor. The energy received at the at least one sensor is at different intensity levels depending upon the ridges and valleys of the at least one fingerprint. The at least one sensor sends a signal to the microprocessor regarding the energy intensity level, from which the microprocessor creates a fingerprint image as the energy emitting are sequentially illuminated.

It is another object of the present invention to provide a touch position reader including a screen composed of an array of energy emitting pixels covered by a transparent cover, at least one sensor coupled along an edge of the screen, a driver directing the array of energy emitting pixels of the screen to illuminate in a sequence, and a microprocessor in communication with the driver and the at least one sensor, wherein the microprocessor knows the location of the energy emitting pixel being illuminated and the specific time at which the illumination occurs. When at least one finger is placed on the transparent cover and the driver is activated, energy from each energy emitting pixel sequentially illuminated is reflected off the finger to the at least one sensor. The energy received at the at least one sensor is at different intensity levels depending upon the position of the finger on the screen. The at least one sensor sends a signal to the microprocessor regarding the energy intensity level, from which the microprocessor determines the position of the finger on the screen.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 25 and 26 are schematics of a touch position reader in accordance with the present invention, wherein FIG. 25 shows a light emitting pixel aligned with a finger and FIG. 26 shows a light emitting pixel not aligned with the finger.

DESCRIPTION OF THE PREFERRED EMBODIMENTS

Figure 1:
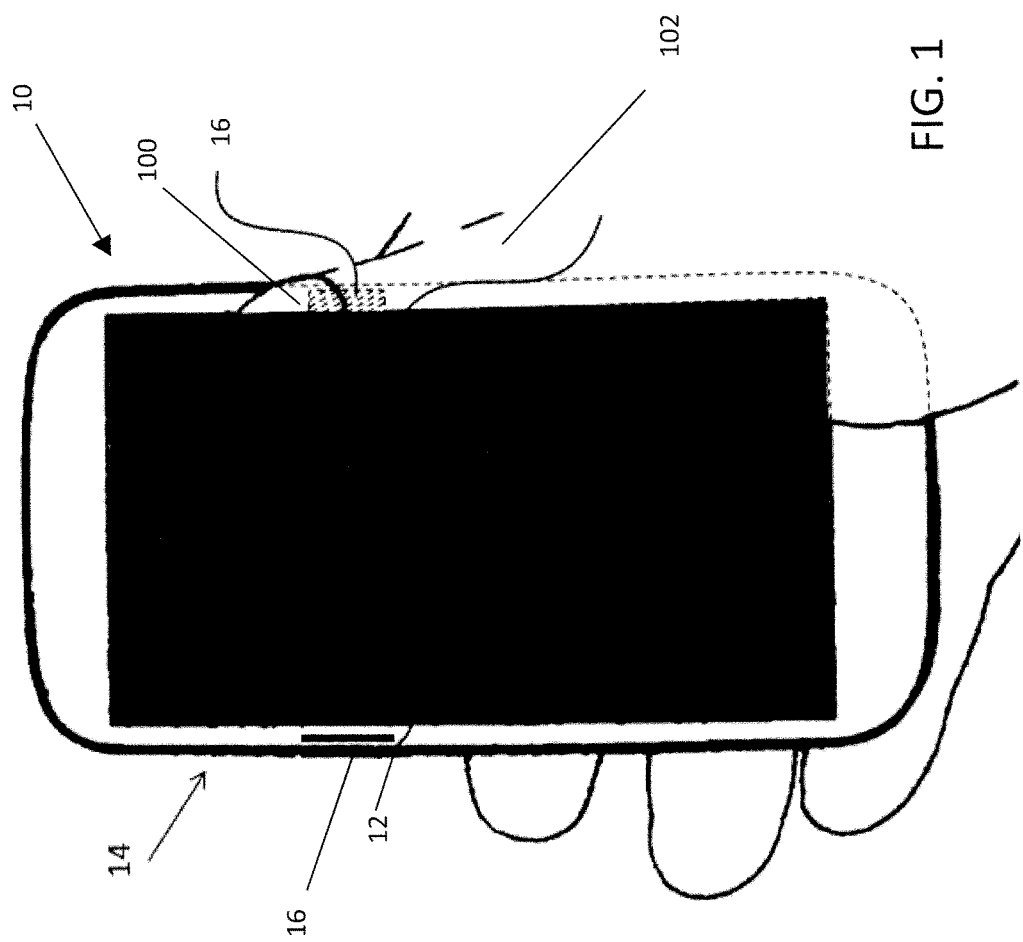
FIG. 1 is a perspective view of a cellphone including the present fingerprint reader.
Figure 2:
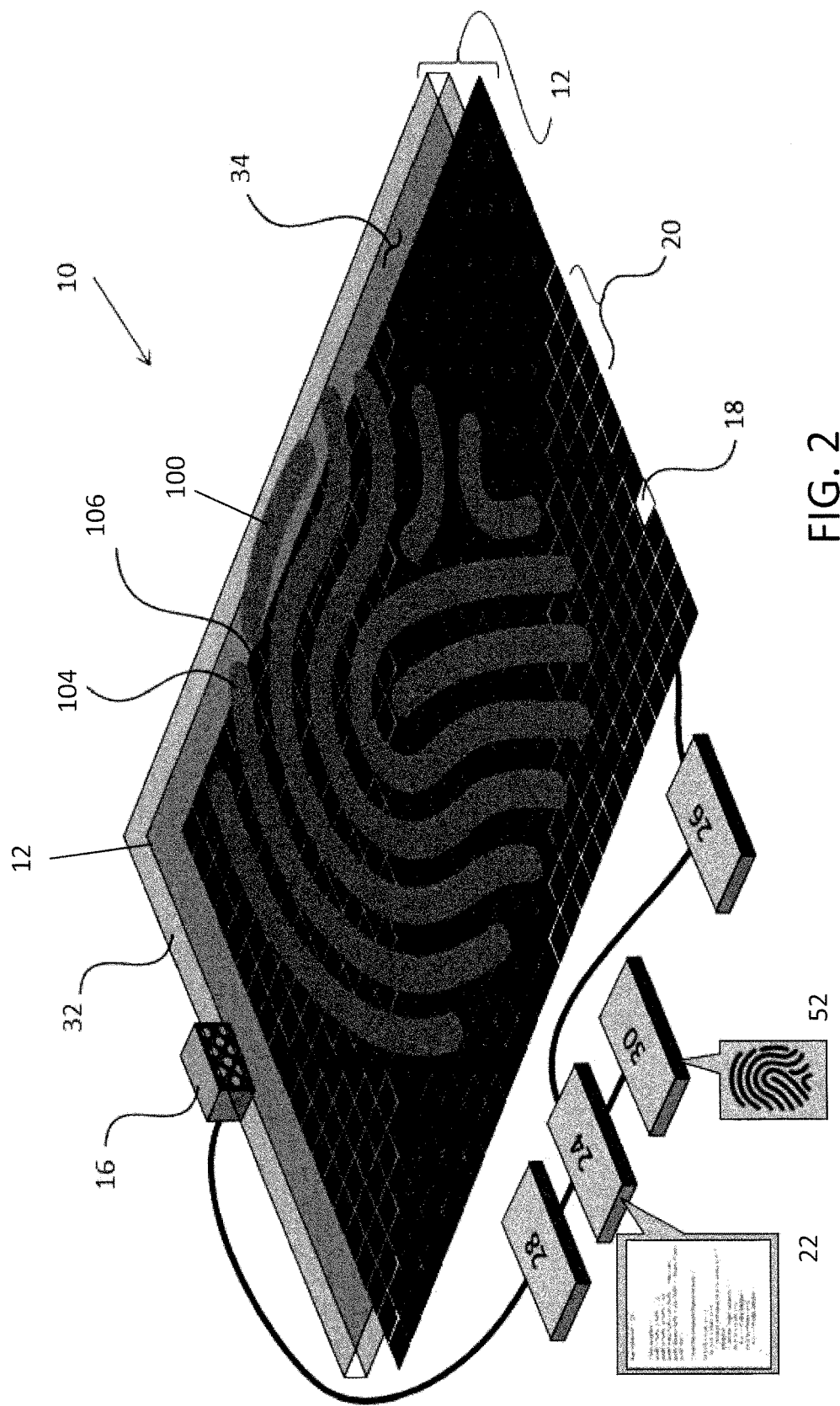
FIG. 2 is a schematic of a fingerprint reader in accordance with the present invention showing the various functional elements.
Figure 3:
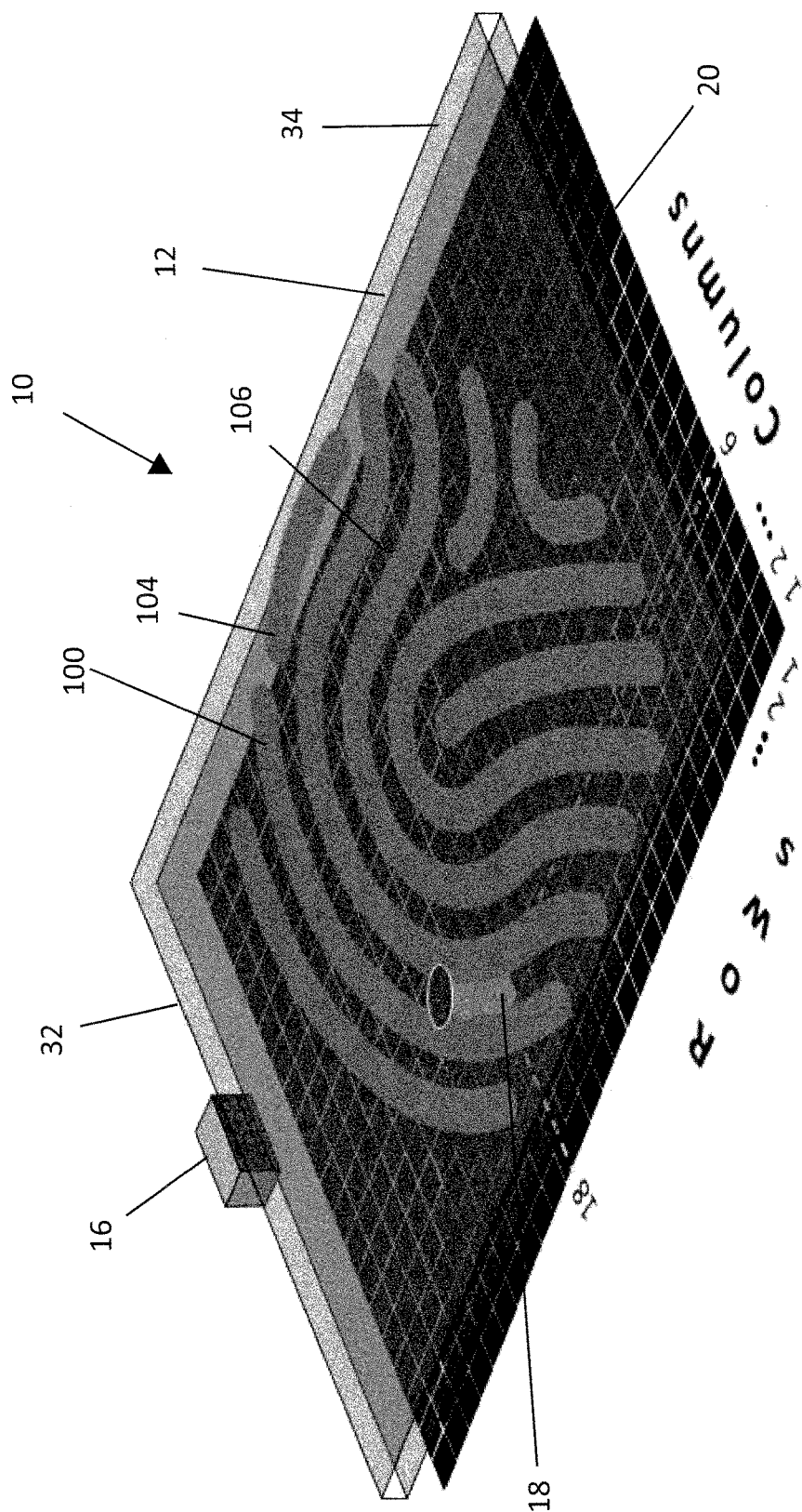
FIG. 3 is schematic of a fingerprint reader as shown in FIG. 2 with a fingerprint valley illuminated.
Figure 4:
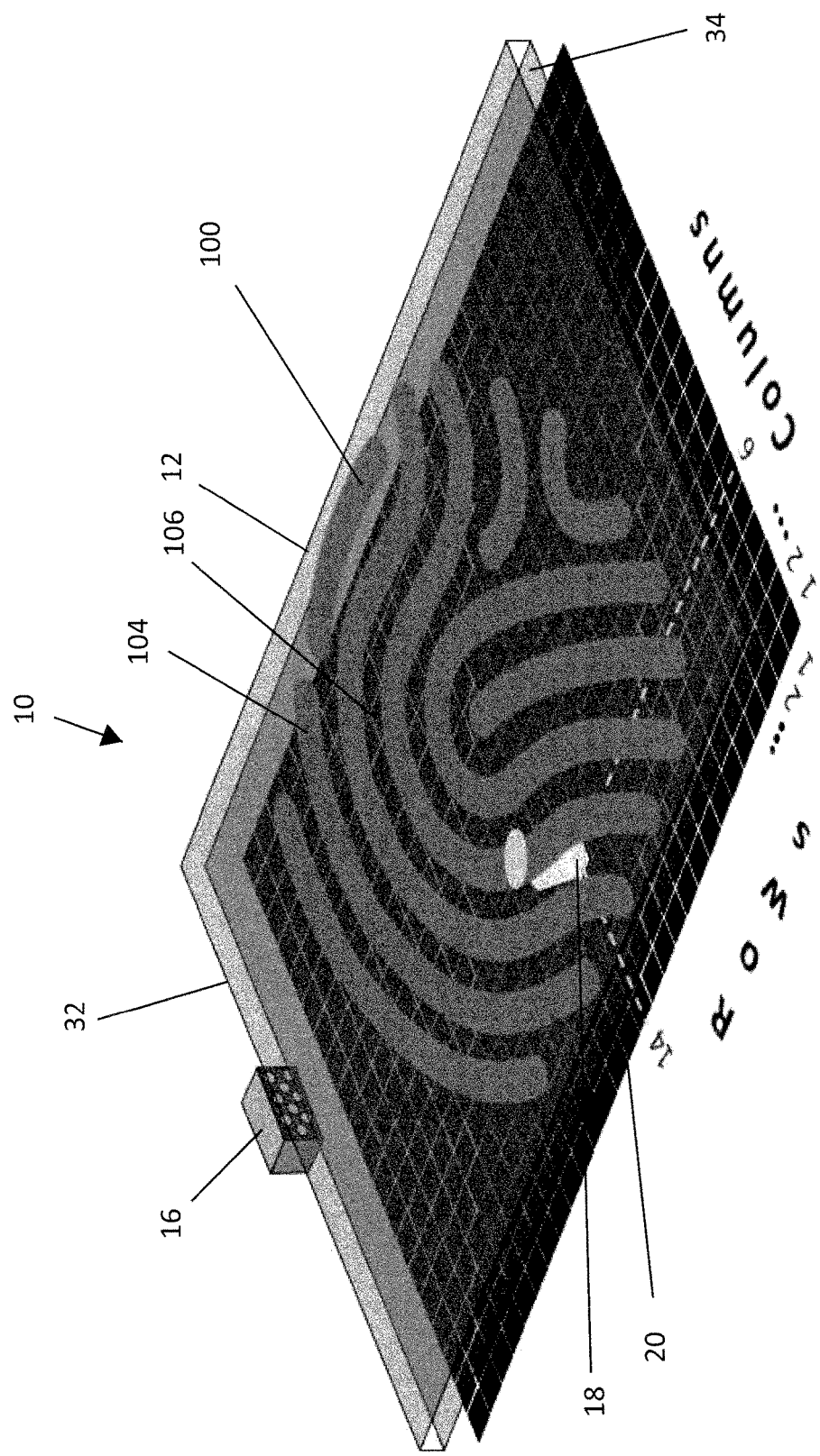
FIG. 4 is a schematic of the fingerprint reader shown in FIG. 2 with a fingerprint ridge illuminated.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

As stated above, and with reference to the embodiment disclosed in FIGS. 1 to 9, the present invention provides a remote sensing fingerprint reader 10 allowing for recordation of a fingerprint placed anywhere on the display screen 12 of a cellphone 14 (or smart phone, tablet, touchscreen laptop, etc.) and a method to record a fingerprint anywhere on the display screen 12 without affecting the display function. Specifically, the remote sensing fingerprint reader 10 enables the cellphone 14 (or other electronic device integrated in accordance with the present invention) to read a fingerprint 100 when it is placed anywhere on the display screen 12. Cellphone makers, therefore, no longer need to allocate space on the front or back of the cellphone 14 for a discrete fingerprint reading device.

The remote sensing fingerprint reader 10 of the present invention scans an illumination source across the fingerprint 100 and measures the reflected and re-radiated optical energy at each scanning location (see FIGS. 3 and 4) to create a model of the fingerprint 100. In accordance with the present remote sensing fingerprint reader 10, when a finger 102 is placed on the display screen 12 of the cellphone 14, it is illuminated by the display screen 12 and the reflections from the fingerprint 100 are recorded by a sensor(s) 16 at the perimeter of the display screen 12. As a result of the remote sensing fingerprint reader 10, a fingerprint 100 may be recorded by the display screen 12 without making any changes to the display screen 12 itself.

While the present disclosure is directed to reading of a single fingerprint placed upon the display screen, it is appreciated the remote sensing fingerprint reader can record multiple fingerprints pseudo-simultaneously. Where it is desired to read multiple fingerprints pseudo-simultaneously, the remote sensing fingerprint reader 10 reads at two or more areas or, the display screen 12 for fingerprints based on the locations of the fingers ascertained by the display screen 12 through the utilization of well-known touch screen technology. The use of multiple fingerprints for verification purposes adds an extra level of security as it adds an additional identification element to the process of identifying the user of the cellphone (referred to commonly as "multi-factor authentication"). Still further, and in conjunction with the use of multiple fingerprints, the relative position of two fingerprints may also be applied in the identification process; that is, security is stronger if the relative alignment, proximity, or angle of the two prints is also read and recorded. For example, for banking transactions of $10,000 or more, the cellphone could require that the user place both middle fingers on the display screen 12 in specific locations. The user may also be required to have both fingers nearly touching and pointed at 10-o'clock and 2-o'clock. That way, if someone wants to steal more than $10,000, they have to chop both of the cellphone owner's fingers off and how to arrange them on the screen.

More specifically, when a finger 102 is placed anywhere on the display screen 12, the process begins with a light emitting pixel 18 under the fingerprint being illuminated. For the purpose of this application, a "light emitting pixel" 18 (or "energy emitting pixel") is considered to be any pixel from which light is emitted—whether the light is created within the pixel such as an LED or OLED, or light passes through the pixel as in an LCD display. Some of the light reflected off the fingerprint is trapped in the transparent cover 34 (for example, the glass top layer) of the display screen 12. A photo-sensor 16 is located at the edge of the transparent cover 34, and the photo-sensor 16 measures the energy (or change in energy) from the reflection or re-radiated energy at the point of interaction. The reflected energy when the light emitting pixel 18 is under a friction ridge is different from the reflected energy when the light emitting pixel 18 is under a "valley" between the ridges. By sequentially lighting the light emitting pixels 18 under the finger 102, measuring the reflected energy at each light emitting pixel 18, noting the difference between the friction ridges and valleys, and mowing the location of each light emitting pixel 18, a map/image of the fingerprint can be built (see FIGS. 3 and 4). The remote sensing fingerprint reader 10 does not require new layers, or high numbers of sensors. It is, therefore, lower cost, less volume, and will not affect the display.

Figure 23:
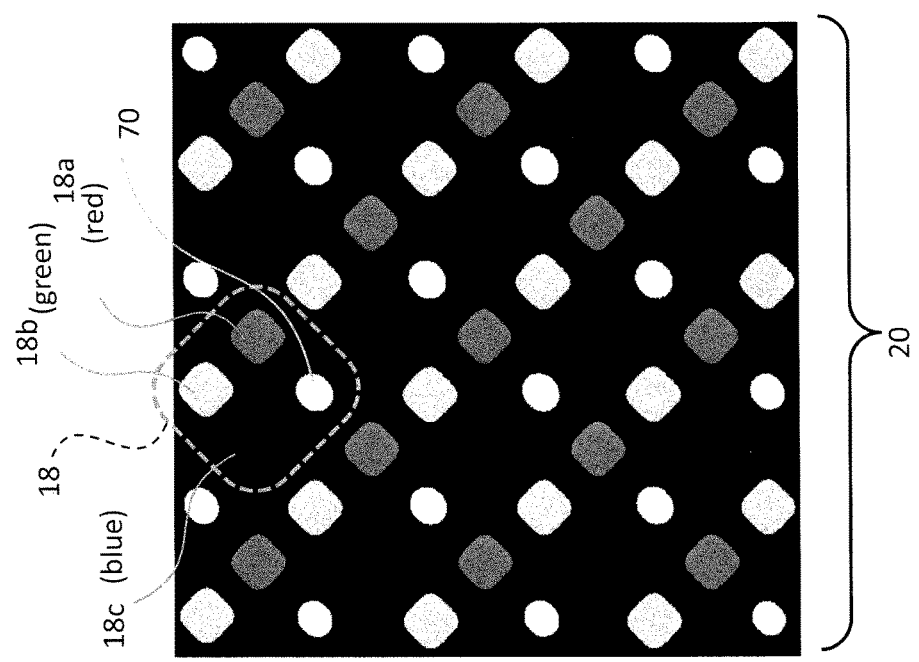
FIG. 23 is a schematic of an array of light emitting pixel for both display purposes and fingerprint reading purposes in accordance with the present invention.

Briefly, and in accordance with a remote sensing fingerprint reader 10 in accordance with a preferred embodiment, a display screen 12 includes an array 20 of light emitting pixels 18 covered by a transparent cover 34 (usually glass). In accordance with a preferred embodiment, the emitting pixels 18 used in conjunction with the present remote sensing fingerprint reader 10 are the same light emitting pixels 18 used by the cellphone 14 to create images for viewing by users of the cellphone. As such, minimal modification will be necessary in implementing the remote sensing fingerprint reader 10 for use with current cellphones and other electronic devices with similar display screens. However, it is appreciated the present invention may be implemented by providing a completely separate display screen 12 or a separate array 20 of light emitting pixels 18. Where separate light emitting pixels are used, as discussed below with reference to FIG. 23, those light emitting pixels used in conjunction with the remote sensing fingerprint reader (secondary light emitting pixels) maybe interspersed throughout the normal "Visible" pixel array (primary light emitting pixels) or they may be positioned on another level below or above the normal "Visible" pixel array. For example, the separate array of pixels may generate IR or UV frequencies that are not visible to the naked eye.

Furthermore, it is appreciated the present invention may be implemented as an independent device or module. A dedicated fingerprint reading device can be built using an array of energy emitting pixels 20, transparent cover 34, and the other necessary components.

At least one photo-sensor 16 is positioned along the perimeter of the display screen 12. For example, the photo-sensor 16 might ultimately be similar to the cameras found in current cellphone 14, as these cameras are actually an array of photo-sensors. These cameras are small, fairly inexpensive, and extremely sensitive to light in the same spectrum of the light emitting pixel 18. Considering such cameras as implemented for use as a photo-sensor 16 in accordance with the present invention, it would not require several-million light collecting pixels in an array as found in cameras, but only require one light collecting pixel. As a result, all the details associated with making a light collecting pixel array may be obviated, while the same chemistry and integrated circuit fabricating techniques may be employed to essentially make one large light collecting pixel.

While a photo-sensor 16 is disclosed in accordance with a preferred embodiment of the present invention, it is appreciated other sensors capable of capturing or measuring "light"—electromagnetic energy—could be used in accordance with the present invention. As will be appreciated based upon the following disclosure, the core of the remote sensing fingerprint reader 10 involves the use of the light emitting pixels 18 of the display screen 12 as the energy source, and those emitters are limited to "light". However, and considering the fact that some LED and LCD panels used in display screens 12 emit significant UV or infrared light, the sensor 16 would not have to operate in the "visible" spectrum but could operate in the UV or infrared domain. These elements are used in identifying fingerprint friction ridges 104 and fingerprint valleys 106.

The light emitting pixel array 20 provides an adjustable and movable (in discrete steps) source of illumination used to illuminate different areas of the fingerprint 100. Light from a light emitting pixel 18 is reflected differently if a light emitting pixel 18 is under a fingerprint friction ridge 104 (see FIG. 4) or fingerprint valley 106 (see FIG. 3). The transparent cover 34 acts as a medium to transfer the energy from the reflections to the photo-sensor 16. The light emitting pixels 18 are illuminated in sequence, and the remote sensing fingerprint reader 10 records the resultant varying energy pulses associated with each light emitting pixel 18 to construct a model or image of the fingerprint 100. A computer program 22 operating on a microprocessor 24 is required to record the energy pulses from the photo-sensor 16 and construct an image or model of the fingerprint 100.

In particular, the functional elements of the remote sensing fingerprint reader 10 include an array 20 of light emitting pixels 18 and a display driver 26 directing the light emitting pixels 18 of the display screen 12 to illuminate. The remote sensing fingerprint reader 10 also includes a microprocessor 24 in communication with the display driver 26 (as well as other components of the cellphone 14). By communicating with the display driver 26, the microprocessor 24 "knows" the location of the light emitting pixel 18 being illuminated and the specific time at which the illumination occurs. As will be fully appreciated based upon the following disclosure, the light emitting pixels 18 may be illuminated individually or in groups upon command from the display driver 26 and the microprocessor 24. One or more photo-sensors 16 are mounted adjacent the array 20 of light emitting pixels 18. The photo-sensors 16 are positioned so as to receive the energy reflected or emitted from the interaction of the illumination from the light emitting pixel 18 and the fingerprint ridge 104 or fingerprint valley 106 of the fingerprint 100 directly above the light emitting pixel 18. Based upon energy reflected as a result of the interaction of the light emitting pixel 18 emission with a fingerprint, which is ultimately detected by the photo-sensor 16, the photo-sensor 16 generates a signal that is sent to an A/D converter 28 that converts the analog signal generated by the photo-sensor 16 to a digital signal. The digital signal is transmitted to the microprocessor 24. With the information regarding the light emitting pixel 18 illuminated and the signal generated by the photo-sensor 16, the microprocessor 24 sequentially processes and combines the digital location of the light emitting pixel 18, and intensity data from the A/D converter 28 (and photo-sensor 16) to create an image 52. Thereafter, the image 52 generated by the microprocessor 24 is stored within a memory 30 of the remote sensing fingerprint reader 10.

In accordance with one embodiment, the recording elements of the remote sensing fingerprint reader 10 can be the microprocessor 24 and memory 30 of the cellphone 14 (watch, computer or other device) into which the remote sensing fingerprint reader 10 is integrated. It is however, appreciated that a dedicated data microprocessor (or microcontroller), or other dedicated device might be used in conjunction with the remote sensing fingerprint reader. That is, the remote sensing fingerprint reader may be packaged as an "embedded module" with a good deal of the basic processing power built into a closed system and sold as a "unit" which would then be integrated into the cellphone. Embedded modules such as this are attractive to system builders because they often save time and complexity when integrating a new function into an existing device.

The processing and recording of the data in accordance with the present invention is accomplished in the following manner. With the action of lighting each light emitting pixel 18, a minimum of two pieces of information are delivered to the processing unit and stored. The first piece of information is the location of the light emitting pixel 18 that was illuminated (index number or x-y coordinates (see FIGS. 3 and 4)). The second piece of information is the amount of energy reaching the photo-sensor 16. These two pieces of information are collected at the microprocessor 24 for a range of light emitting pixel 18 locations, and a digital map is constructed having numbers in an array that correspond to the amount of energy received by the photo-sensor 16 at each light emitting pixel 18 location. Because the energy levels striking the photo-sensor 16 are different when a light emitting pixel 18 is under a "ridge" 104 than when a light emitting pixel 18 is under a "valley" 106 the map will have some values higher and some lower. Looked at in the whole, the array of light emitting pixel data will correspond directly to an image 52 of a fingerprint 100 showing the locations of the ridges 104 and valleys 106.

Once this image 52 is created and stored in memory 30, the remaining exercises of fingerprint analysis, extraction, and matching are commonplace. There are a variety of public and proprietary methods used to identify an individual based on a fingerprint "map" or "image". The output of the remote sensing fingerprint reader 10 will be compatible with all known fingerprint matching and rejection systems.

Specifically, the photo-sensor 16 will output a voltage to an A/D converter 28. The A/D converter 28 will provide a digital signal to the microprocessor 24 of the unit in which the remote sensing fingerprint reader 10 is being used. The microprocessor 24 may farther manipulate the information. There are many existing algorithms in the realm of "digital image processing" to enhance digital data comprising an image for increased clarity, contrast, or other purposes. Eventually, the microprocessor 24 (or micro-controller), or dedicated device, will direct the storage of the image 52 information in memory 30 so that the information can be recalled for further manipulation or to be used for identification.

It is appreciated concepts underlying the remote sensing fingerprint reader 10 may be implemented in a variety of devices where a display screen 12 is employed, and where quick and easy access to fingerprint readings are desired. Understanding this fact, the remote sensing fingerprint reader 10 is described herein in conjunction with a cellphone 14. Implementation of the remote sensing fingerprint reader 10 into a cellphone 14 would require the addition of a photo-sensor 16 about the perimeter of the display screen 12 of the cellphone 14, and such a photo-sensor 16 would preferably be added to the edge 32 of the existing transparent cover 34 of the cell phone. Such an implementation would also require modification of the cellphone's microprocessor 24 to accommodate the processing of information in accordance with the remote sensing fingerprint reader 10. With this in mind, the output from the photo-sensor 16 must be recorded and associated with each light emitting pixel 18 to form an image or map. This is a fairly typical A/D conversion and data manipulation process.

While it is appreciated a display screen 12 including a light emitting pixel array 20 covered by a transparent cover 34 and at least one photo-sensor 16 are required elements of the remote sensing fingerprint reader 10, it is further appreciated additional elements could be added to guide the signal (light) to the photo-sensor 16. With this in mind, a cellphone 14 maker desiring to implement the remote sensing fingerprint reader 10 would add photo sensor 16 at the perimeter of the display screen 12, add the appropriate electronics to do the common A/D conversion necessary, program the display driver 26 to illuminate the light emitting pixels 18 one at a time, and create a program to assemble the digital information into an image or model. From that point, the software, matching algorithms and applications will operate as they do today. For example, a system such as that disclosed in Jain A. K., Hong L., Pankanti S., Bolle R., An identity-authentication system using fingerprints, Proc. IEEE 85 (9) pp: 1364-1388, 1997, which is incorporated herein by reference, may be use in accordance with the present invention. Jain describes a basic algorithm for identifying minutia in an image of a fingerprint and using the minutia pattern to uniquely identify the source (person) of the fingerprint. Similar algorithms are presently used in smartphones that have a fingerprint reader as part of the phone.

More particularly, the scanning illumination used in accordance with remote sensing fingerprint reader 10 is created by activating the array of light emitting pixels 18 (such as the individual OLEDs (organic light-emitting diode) on a display screen 12 of a cellphone 14) one light emitting pixel 18 at a time. The light from each light emitting pixel 18 is sequentially projected onto the region of the fingerprint 100 in close proximity to the light emitting pixel 18, and the reflected and re-radiated energy is measured by the photo-sensor 16 to create a digitally generated scan of the fingerprint 100 of finger 102. Taking advantage of the directionality of the OLED screen light emitting pixels 18 when placed under a transparent glass cover 34 commonly used in conjunction with cellphones 14, the image of the display screen 12 may be projected onto the finger simply by placing the OLED display screen 12 into close proximity of the finger 102. By using one or more photo-sensors 16 attached to the perimeter (or edge) 32 of the transparent cover 34 to detect light trapped by TIR in the transparent cover 34, the OLED display screen 12 can be used to generate a fingerprint image.

While the following description discusses implementation of the remote sensing fingerprint reader using an OLED display screen, it is appreciated any pixel-based screen technology that provides discrete illumination sources may be used, such as, but not limited to, Liquid Crystal Display (LCD), Light Emitting Diode (LED), Plasma Display Panel (PDP), Cathode Ray Tube (CRT), etc. may be used in accordance with the present invention.

By illuminating the light emitting pixels 18 of the pixel array 20 one at a time, the remote sensing fingerprint reader 10 allows for the creation of a true one-to-one model or image of the fingerprint 100 when a finger 102 is placed anywhere on the active area of the internally illuminated display screen 12. Instead of illuminating the full finger with a common light source and capturing a full image of the print using a digital camera chip, as is discussed above in the Background of the Invention, the illumination is scanned across the fingerprint, one light emitting pixel at a time, in rows and columns and the reflected and re-radiated energy is measured and saved at each point of illumination. From this energy map, a model or image of the fingerprint can be recreated.

Figure 5:
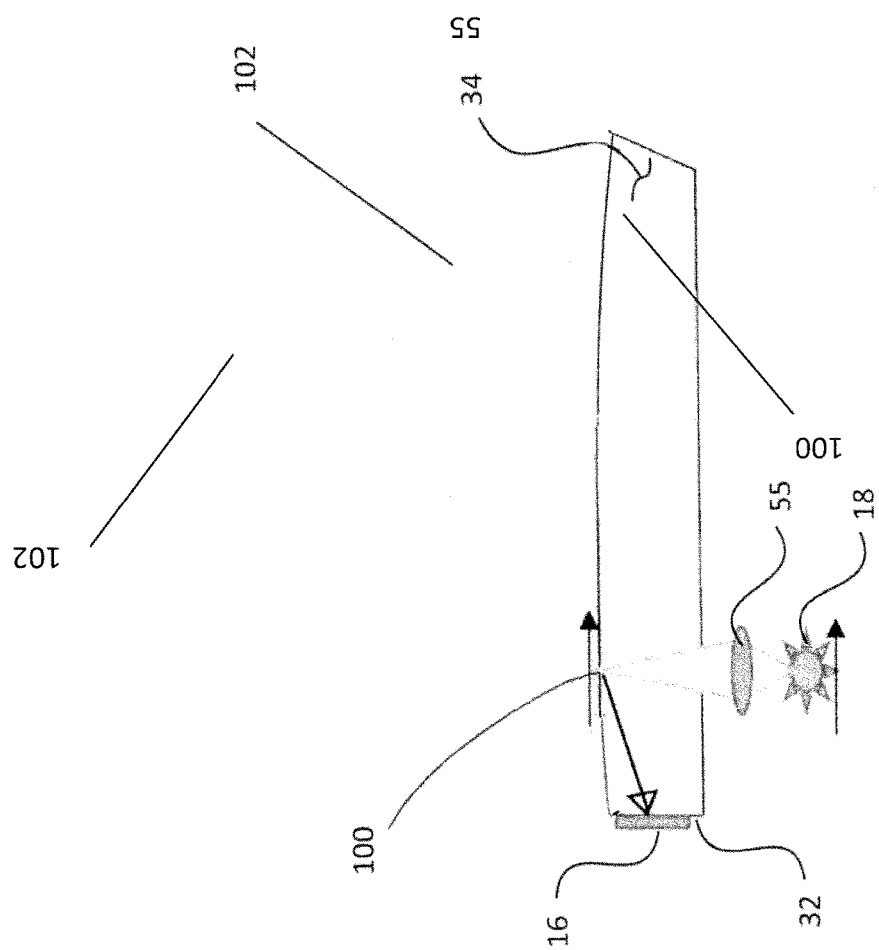
FIG. 5 is a side view showing reflective properties as light energy as projected on a finger.

With reference to FIG. 5, illumination from the single light emitting pixel 18 is focused on a small spot on the fingerprint 100 by a lens 55 and all the light that reflected and re-radiated from that spot is captured by the photo-sensor 16. As the illuminated light emitting pixel 18 is changed to different positions relative to the finger 102, the intensity of the reflected and re-radiated light changes. The intensity and/or color of the reflected and re-radiated light vary depending on whether the illuminated light emitting pixel 18 is located at a friction ridge 104 or at a valley 106 between ridges 104. A full model or image of the fingerprint 100 is recreated by recording the energy level captured at the x-y coordinates of each corresponding illuminated light emitting pixel 18. The resultant image can be manipulated similar to any other digital fingerprint scan and/or plotted on a computer screen (or phone screen) in a similar manner as described in U.S. Pat. No. 4,553,837 entitled "ROLL FINGERPRINT PROCESSING APPARATUS," by Daniel H. Marcus in 1983, which is incorporated herein by reference.

An advantage of creating the image by scanning the illuminated light emitting pixels 18 over the fingerprint 100 in this low-profile configuration is that the point of view of the resultant image is taken from the illuminated light emitting pixel 18 location rather than the sensor 16 location. Any geometric distortion is, therefore, limited to only the accuracy of the x-y coordinates taken at each sample point. If the transparent layer 34 is very thin, the light emanating from the LCD or OLED light emitting pixels 18 illuminates only a small area above the transparent layer 34, so the focusing requirements of the lens may be minimal or the lens may be removed altogether.

Use of the remote sensing fingerprint reader 10 with an LCD or OLED light emitting pixel array 20, a transparent cover 34 and a fixedly positioned photo-sensor 16 provides a remote sensing fingerprint reader 10 with no moving parts, no geometric distortion, and true one-to-one representation of the fingerprint. The complexity is decreased, and in a typical modification of a cellphone 14 would minimally require the addition of one photo-sensor 16. Furthermore, there is no sensor-based limit to the true size of the fingerprint image captured. The limit is the size of the display screen 12 typically several times larger than a single fingerprint. Even in the small form factor screens used in a typical smartwatch, the sensor 16 will be larger than the finger in most cases (the full size of the display in the watch face). For larger form factors like a cellphone 14 (or tablet, phablet, PC, etc.), it is possible to capture images of multiple fingers in one user action. This greatly increases the overall accuracy of the remote sensing fingerprint reader 10 through not only more fingerprint data, but also exploiting the geometric relationship among the fingers.

Figure 6:
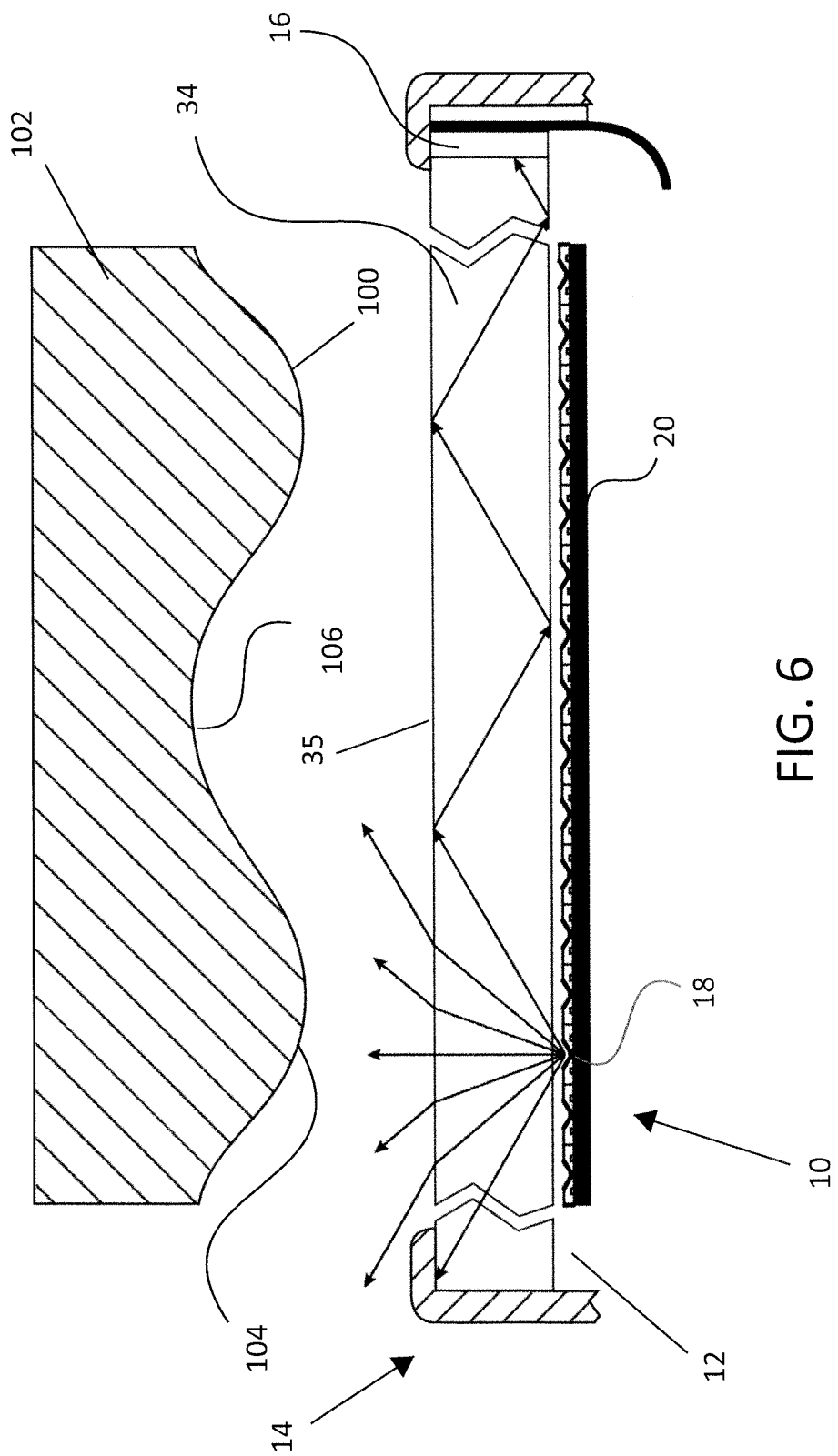
FIGS. 6, 7, 8 and 9 are side cross-sectional views showing operation of a fingerprint reader in accordance with the present invention.

The operation of creating an image of a fingerprint is shown in FIGS. 6 to 9. In FIG. 6, the illumination of a light emitting pixel 18 is shown when no finger is in place. Some of the light from the light emitting pixel 18 is captured within the transparent cover 34 and may be projected directly to the sensor 16 shown at the right. Additional light is conveyed by total internal reflection and makes its way to the photo-sensor 16. Some energy is refracted through the top surface 35 of the transparent cover 34 and is lost.

Figure 7:
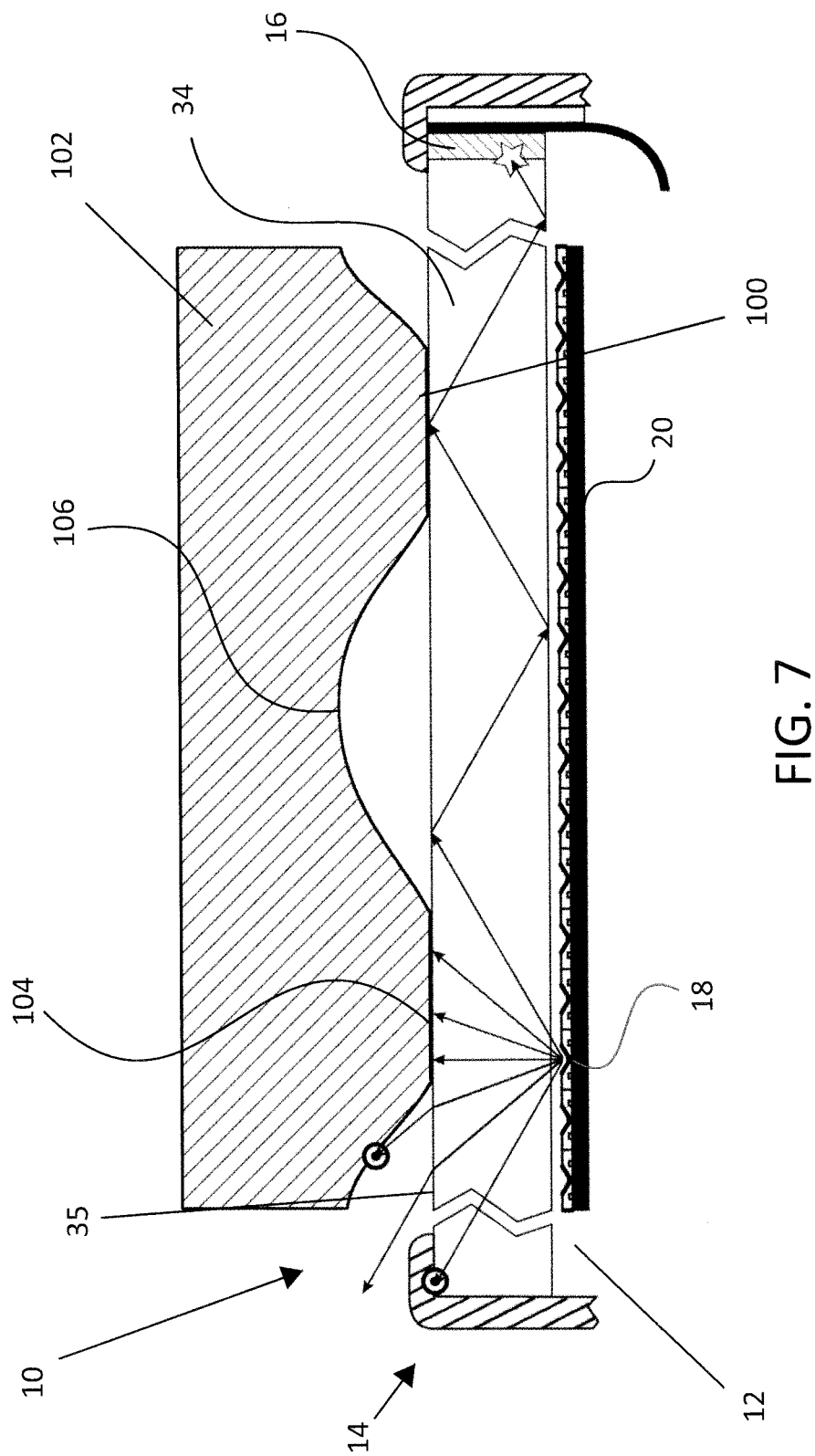
Figure 8:
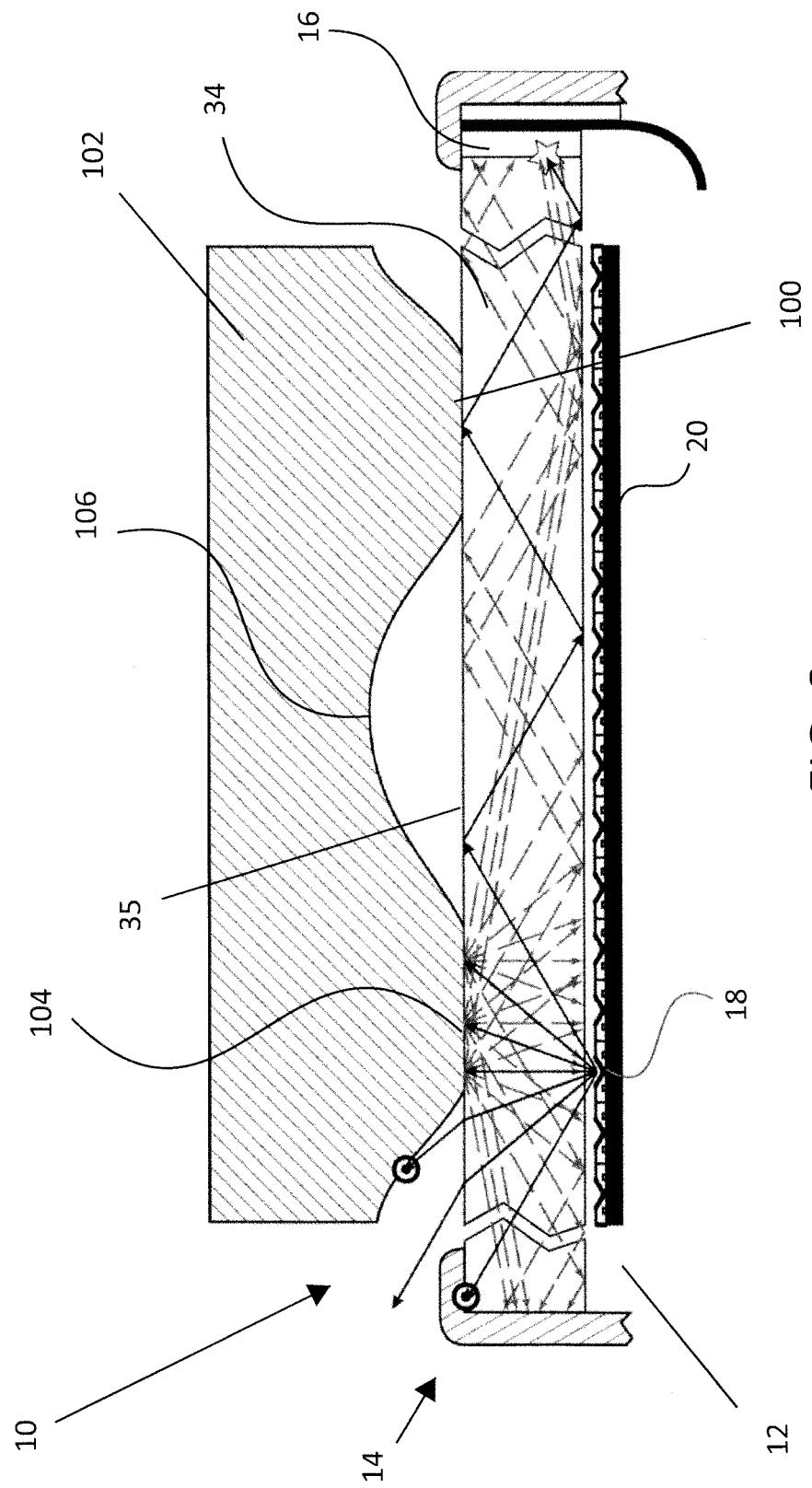

When a finger 102 is placed in contact with the transparent cover 34, some of the light illuminates the ridge 104 of the fingerprint 100 as shown in FIG. 7. The light rays that illuminate the finger ridge 104 cause the ridge 104 to reflect and re-radiate the light, broadcasting light into the transparent cover 34 in all directions. The rays in FIG. 8 represent the combined light from both the illuminating light emitting pixel 18 and the light reflected and re-radiated from the interaction with the fingerprint ridge 104. Note the higher number of interactions at the photo-sensor 16 on the right.

Figure 9:
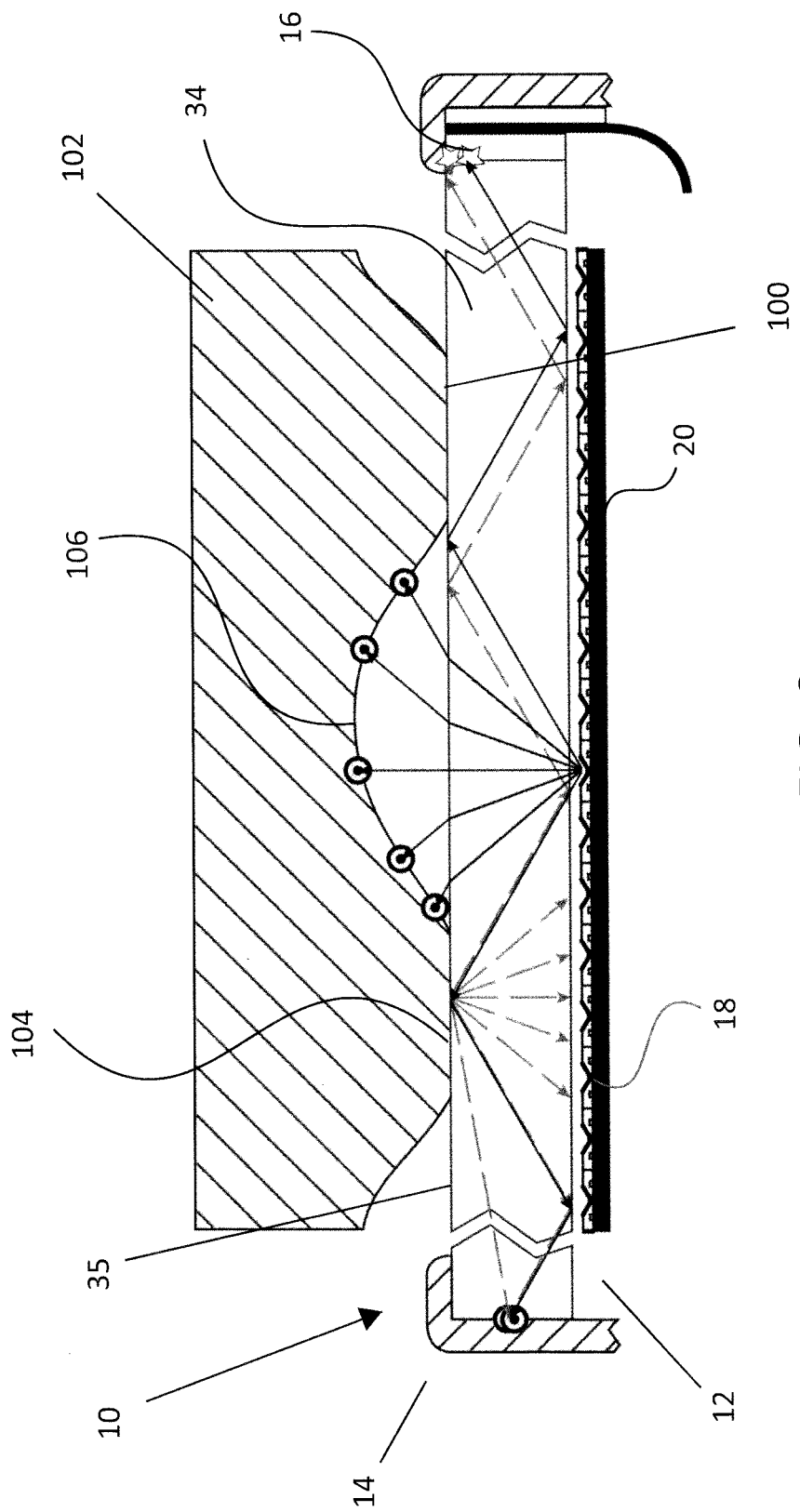

FIG. 9 shows reflections and re-radiation from a light source that is not positioned directly under a friction ridge (that is, a valley 106). In this case, the light dispersal is different than the situation when a ridge is in close proximity to the source. This results in a different level of energy reaching the photo-sensor 16. In this illustration, note the relatively fewer rays striking the photo-sensor 16 compared to FIG. 8.

In practice, the energy level received at the photo-sensor 16 in the case of the illumination being directly under a ridge 104 may be higher or lower than the energy conveyed when the source is under a valley 106. The increase or decrease depends on the optical properties of the glass of the transparent cover 34, illumination spectrum, source dispersion, coating used on the contact surfaces, and other optical properties. Those details can be selected to optimize the performance against the metrics of interest. The important phenomenon is that the resultant total reflected energy will be different depending on whether the source is under a ridge 104 or a valley 106 and whether the activated energy emitting pixel 18 is under a ridge 104 or a valley 106.

In the operation of collecting an image of the fingerprint 100, the entire display screen 12 can be scanned, or in a limited scanning area 54 (see FIGS. 15 and 16 as discussed below in greater detail). Touch sensors 80 in the remote sensing fingerprint reader 10 can be used to sense where the finger is in contact with the display screen 12, and the remote sensing fingerprint reader 10 can direct the scan to sequentially activate the energy emitting pixels 18 in a scanning area 44 that is local to the point of contact. The device can direct the remote sensing fingerprint reader 10 process to begin when the touch sensors or touch screen reports that a finger 102 has touched the display.

Although the disclosed embodiments relate to implementation with a transparent cover composed of flat glass, the principle applies to flat or curved glass (see FIG. 5). As, the reflected and re-radiated light travels through the glass, it is reflected internally to some degree regardless of the glass curvature. If the glass is curved (either dramatically as in the Galaxy S6 edge or more subtly as in other phones, watches, and devices), most of the light will continue to be trapped in the glass through partial reflection and TIR effects and will ultimately reach a photo-sensor 16 or photo-sensors around the perimeter of the display screen 12.

Similarly, the fingerprint can be read directly on a curved section of the transparent cover 34 with this concept. In fact, the curved surface may be a preferred location to capture the fingerprint model or image because in some contemporary cellphone designs the curved sections of the display near the edges of the device—and therefore in close proximity to a photo-sensor.

Additionally, the invention is not limited to reading a single fingerprint. Multiple fingerprints can be read in one operation by scanning the illumination over a larger area, or scanning in multiple areas under each fingerprint. The position of each important area can be determined by the touch sensors 80 incorporated into many devices.

Figure 10:
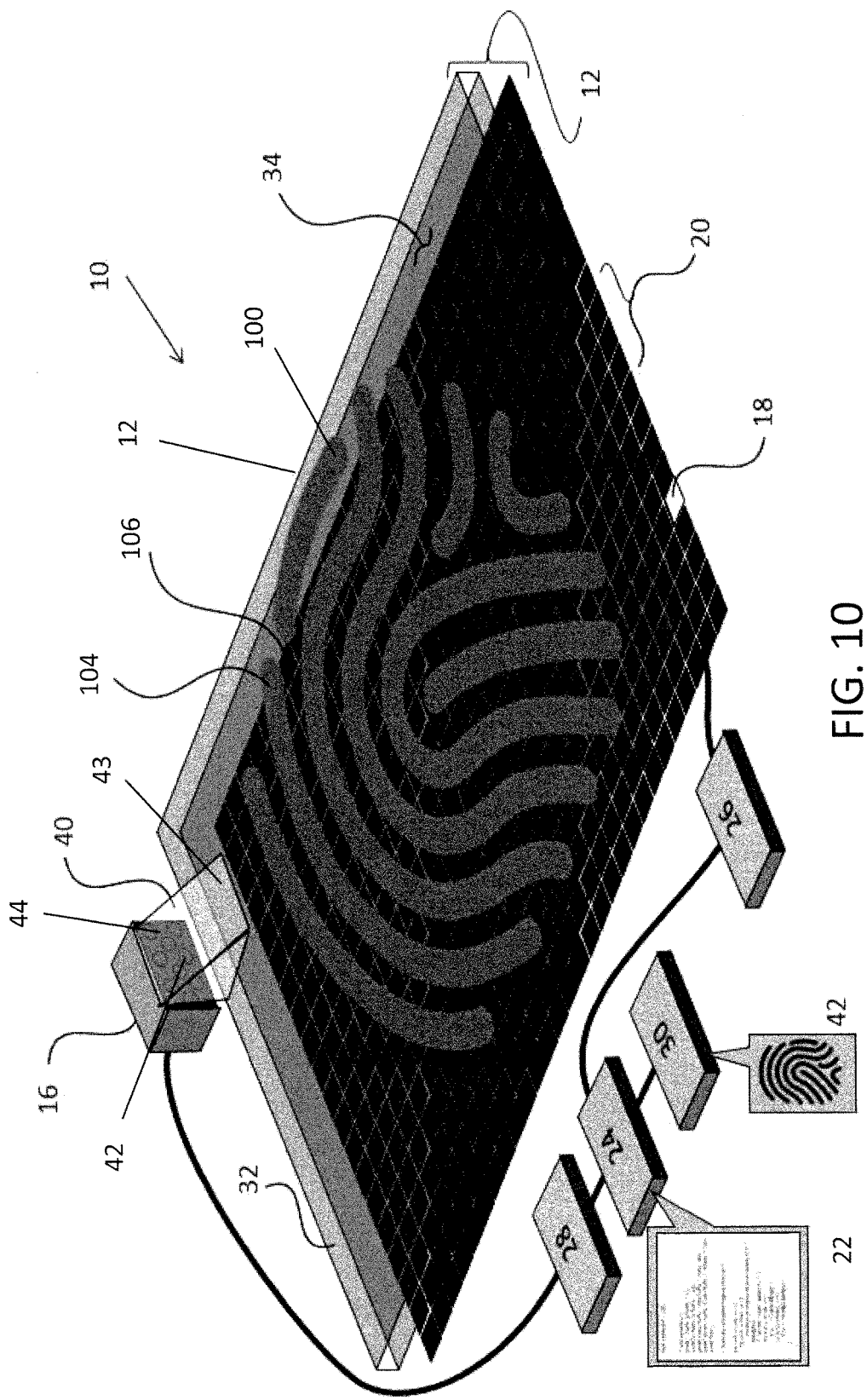
FIG. 10 is a schematic of an alternate embodiment of the fingerprint reader.
Figure 11:
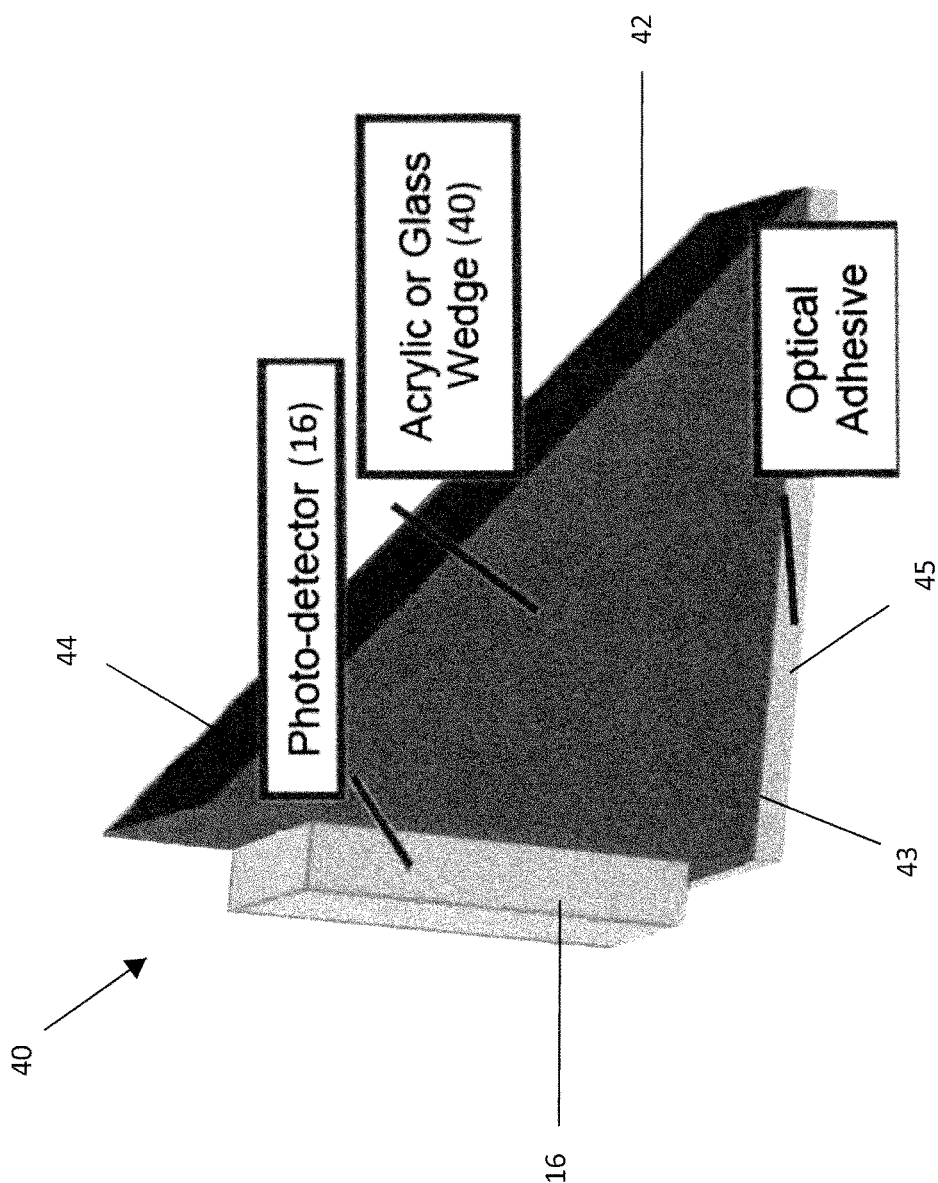
FIG. 11 is a detailed perspective view of the energy directing structure shown in FIG. 10.
Figure 12:
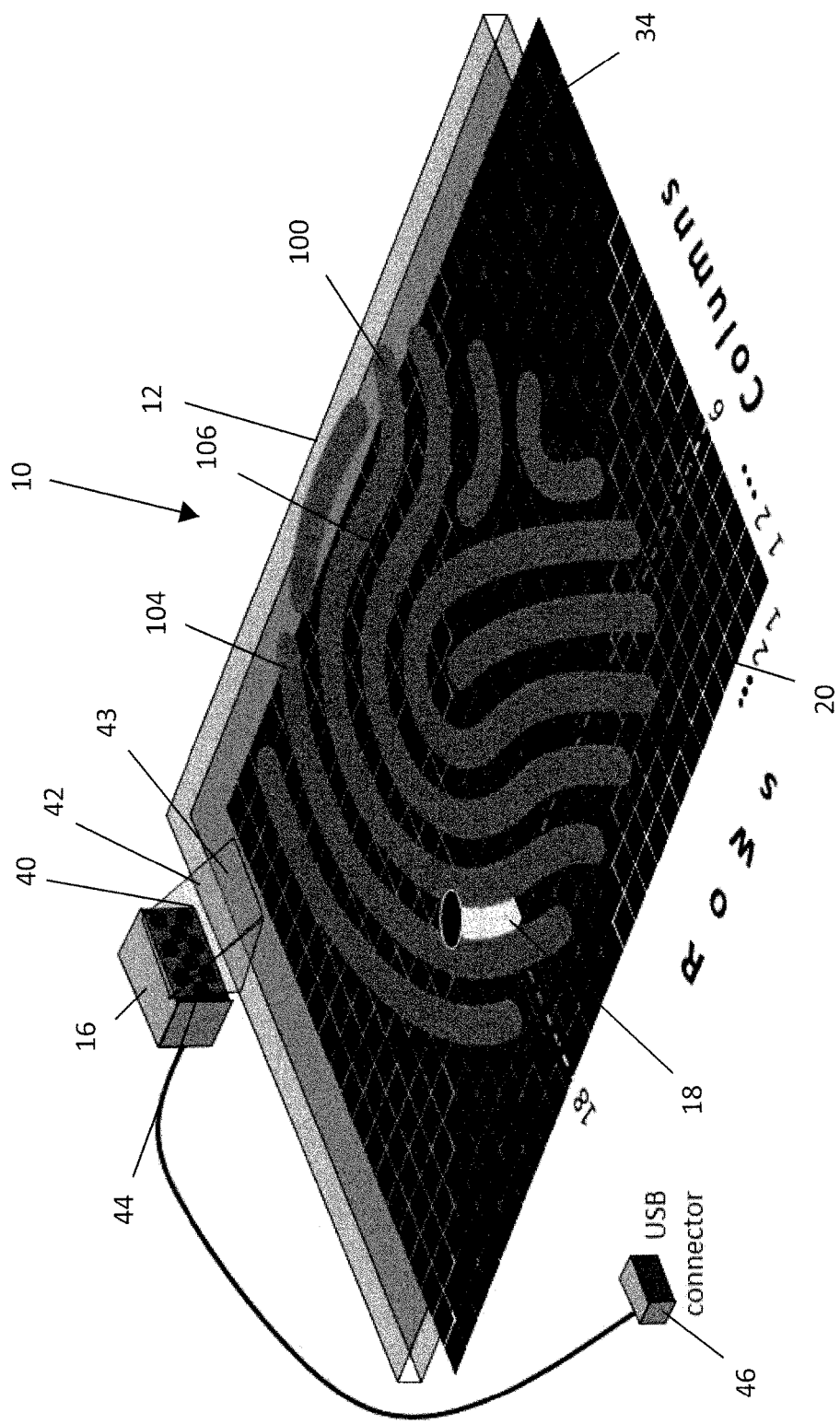
FIG. 12 is a schematic of an alternate embodiment of the fingerprint reader shown in FIG. 10.

The photo-sensor 16 need not be positioned at the "edge" of the transparent cover 34. A three-dimensional, transparent structure 40 can be added to the surface of the glass to allow energy to be redirected to a more convenient location. For example, the embodiments disclosed with reference to FIGS. 10 to 12 show an example of a small energy directing structure 40 in the shape of a wedge that can be placed onto the glass top surface 35 of the transparent cover 34 of a cellphone 14. The energy directing structure 40 includes optics 42 that allow for reflection of energy coming from the display screen 12 to one or more photo-sensors 16 attached to the wedge 40. There are at least two reasons to employ such an embodiment. One implementation would be a built-in energy three-dimensional, transparent structure that carries the signal to a preferential location for the photo-sensor within the phone or device. All of these elements are really small, so even if the three-dimensional structure is only a mm or two, it would allow the photo-sensor 16 to be 2× or 3× larger—still very small, but potentially less expensive or more sensitive. Additionally, the three-dimensional transparent structure might be a more complicated shape that directs the light to one of the existing cameras that are built into the cellphone. The camera would then become a dual use device—acting also as the photo-sensor 16 and potentially the A/D converter thereby eliminating the need for those elements altogether.

It is appreciated the use of such an energy directing structure 40 will require the passage of light through the transparent cover 34 and into the input 43 of the energy directing structure 40. The use of such an energy directing structure 40 also requires the adhesive attachment to the top surface 35 of the transparent cover 34 of the display screen 12. With this in mind, an optical adhesive 45 that will defeat the TIR effects under the energy directing structure 40 is used to secure the input 43 to the top surface 35 of the transparent cover 34. A parasitic device that measures energy changes through the faces of the glass can be used when there is an advantage in the physical implementation (such as retro-fitting existing devices). The photo-sensor 16 need not be positioned at the "edge" of the transparent cover 34. Such as device is shown in FIGS. 10 and 11 which discloses a small energy directing structure 40 that can be placed onto the glass top surface 35 of the transparent cover 34 of a cellphone 14. The energy directing structure 40 includes optics 42 that allow for reflection of energy coming from the display screen 12 to one or more photo-sensors 16 contained with the housing 44 of the energy directing structure 40.

There are two reasons to employ such an embodiment. One is to retrofit an old cellphone 14. In that case, and with reference to FIG. 12, someone would build a photo-sensor 16 into the energy directing wedge and attach a cable that plugs into a USB linked 46 to a microprocessor 24 that ultimately performs that calculations discussed above. The second implementation would be a built-in energy directing stricture that is "upside down"—making the energy directing structure 40 sink into the cellphone 14 instead of rising above the top surface. Additionally, it is appreciated the energy directing structure 40 might be a more complicated shape that directs the light to one of the existing cameras that are built into the cellphone. The camera would then become a dual use device—acting also as the photo-sensor for the energy directing wedge thereby eliminating the need for a photo-sensor altogether.

For typical cellphone OLED screens the light emitting pixels 18 are illuminated by the display drivers 26 to the level desired one at a time during a refresh. Display driver 26 technology has evolved continually from simple sequential on-and-hold strategies over a uniformly lit backlight plane, too sophisticated on/off discrete timing of each light emitting pixel 18 within the bulk timing of one full refresh cycle of the display. This is often implemented in concert with on/off and variable brightness cycles of the illumination plane (in display types that use back-lighting) with variation of the brightness plane controlled over the entire device, or in regions, and even to the pixel level. Many innovative and effective technologies and strategies have been developed in order to achieve better balance, contrast, and uniformity in the illuminated screen image. Much of this sophistication in display control and lighting strategies can be used to enhance implementations of the present invention.

Previously, we have described a method of using the remote sensing fingerprint reader 10 concept wherein each light emitting pixel 18 is turned on for a brief time while the energy is recorded at the photo sensor 16, then the light emitting pixel 18 is turned off in preparation for the next light emitting pixel 18 to be sampled. In the most basic configuration, each light emitting pixel 18 is not turned off, but remains "on" through the entire process of recording the image 52. Each other light emitting pixel 18 is illuminated in succession. The last light emitting pixel 18 of the screen 12 remains on for the time remaining before the next refresh cycle begins. This is an accumulated illumination model where the sensor 16 sees increasing energy with each light emitting pixel 18 that is turned on. The increase in energy to the sensor 16 will vary depending on whether the light emitting pixel 18 is under a fingerprint ridge or a valley. Thus the differential of the power curve will show which light emitting pixels 18 are on and which are off and the image or model can be formed.

Simulation Results

Figure 13:
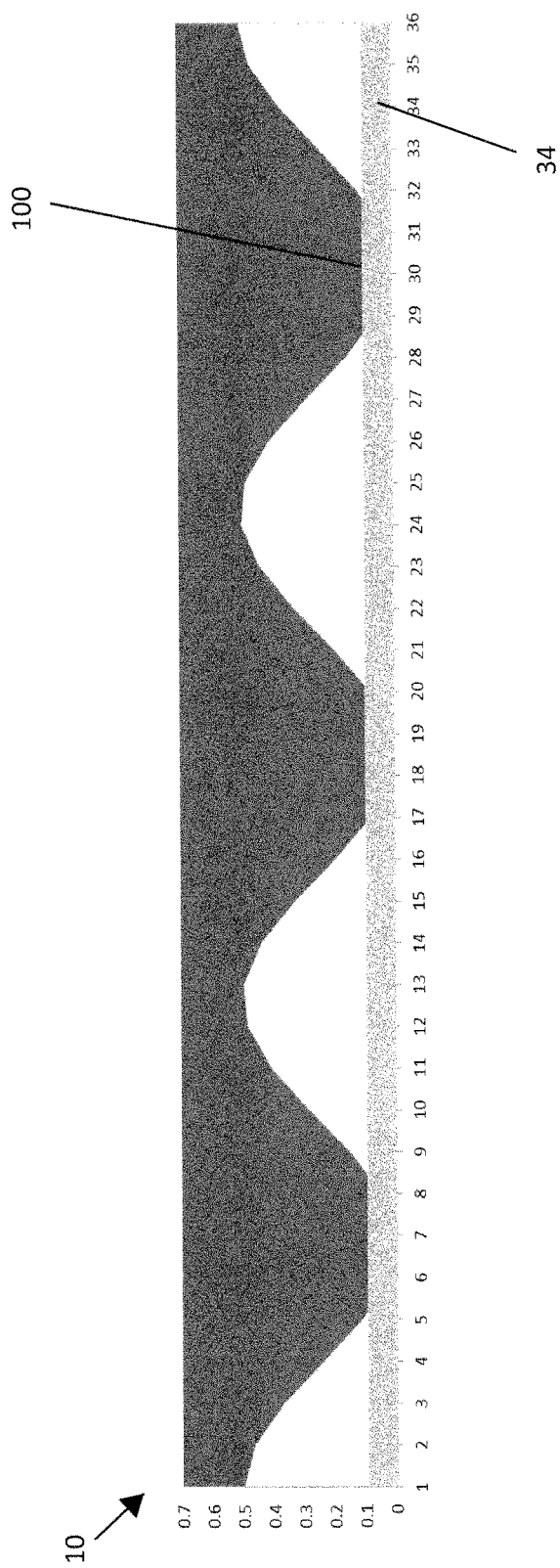
FIGS. 13, 13A, 13B and 13C are schematics and graphs showing simulation results relating to the present fingerprint reader.

A simulation can be made to estimate the signal profile for a single scanned line across a finger having 3 fingerprint ridges in contact with the glass. FIG. 13 shows the configuration in the presence of moderate reflections, significant attenuation and variable ambient light noise.

Light intensity from the source light emitting pixels 18 is assumed to be 100 (normalized to represent 100%). The average ambient light is assumed to be 100× higher at a magnitude of 10,000. The variability of the ambient light at each light emitting pixel 18 sample (for a delta-time of $-2 \times 10^{-6}$ sec) is taken to be 0.1%. The attenuation of the signal is 1% per light emitting pixel 18 (relative to the next closer light emitting pixel 18) as the light emitting pixels 18 become more distant from the sensor 16.

Figure 13A:
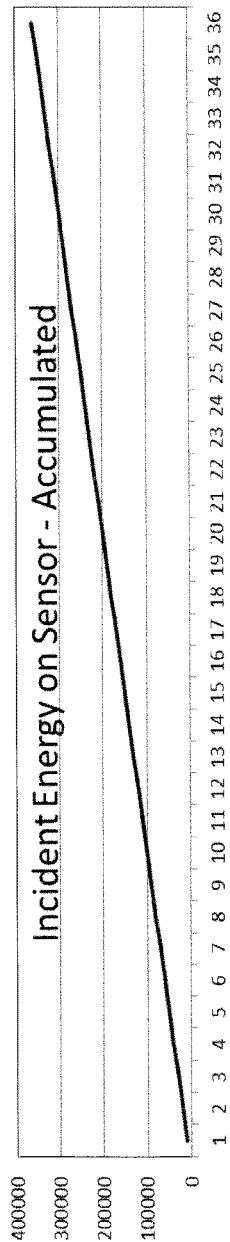

The resultant profile in FIG. 13A shows the incident energy profile if the individual light emitting pixels 18 are illuminated in sequence and left "on" for the entire cycle. Notice the line appears straight. The signal appears to be masked by the increasing energy and by the overwhelming strength of the ambient component.

Figure 13B:
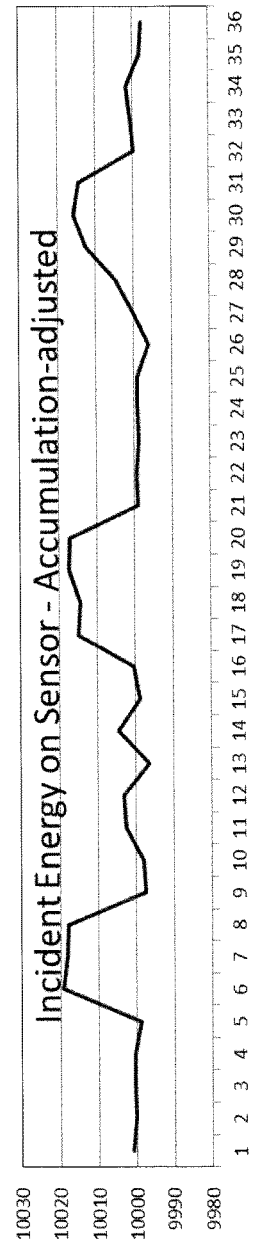

To extract the signal for each light emitting pixel 18 (n=1 to 36) the energy at light emitting pixel n−1 is subtracted from the energy at light emitting pixel n, we get the graph shown in FIG. 13B. The profile showing the presence and absence of fingerprint ridges in contact with the glass is easily revealed.

The accumulated round-off error in this method is minimal because each reading is taken independent of the previous reading. Each value is a product of two direct measurements, and one arithmetic operation. The only complication is the dynamic range of the sensor 16. It may require sensitivity up to 15 db. Small sensors with this capability are commercially available. The capability is driven in part by the digital camera market and the semi-conductor based sensors that have been developed in both CCD and CMOS with high quantum efficiency. Many current digital cameras (including cell-phone cameras) have millions of sensors with this order of sensitivity in small pick-up areas limited by the desired resolution and overall digital sensor size. For example, "New Imaging Technologies" in Verrieres le Buisson, France offers digital sensors with more than 140 db dynamic range. A single large area sensor 16 using these technologies can have remarkably high dynamic range relative to the requirements of this invention.

Figure 13C:
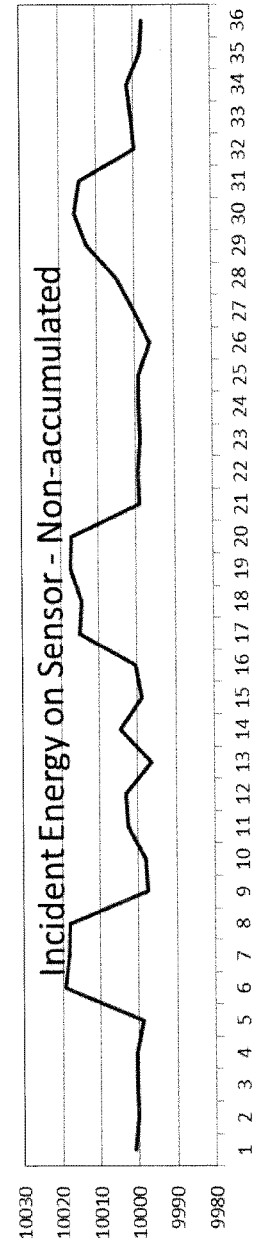

FIG. 13C shows the incident energy profile at the sensor 16 for a device in which the individual light emitting pixels 18 are switched on then off, at each location. The simulated energy profile is identical to the accumulated-adjusted version. In fact, the true signal strength is not different, but implementation of the remote sensing fingerprint reader 10 has the advantage that each pulse of energy can be measured from a common baseline. No subtractions are required to extract the signal, and the dynamic range requirements of the sensor 16 are greatly reduced.

Notice in all cases, the significant step changes in the incident energy are easily discernable even in the presence of accumulating energy, variable noise, and significant attenuation. For light emitting pixels 18 that are not centered directly below ridge or valley—such light emitting pixels 18 can be considered "half" on or off. The side of the tight emitting pixel 18 that is "on" can be determined by observing the state of at the adjacent light emitting pixels 18. This allows the use of interpolation to increase the resolution in the image 52 in a similar manner that touch sensitive panels use a limited number of sensors to achieve relatively high resolutions.

Sensor Efficiency Enhancement

It is appreciated one issue facing practical application of the remote sensing fingerprint reader 10 is improving the image quality of the fingerprint image without introducing distortions to the image that may prevent a faithful duplication of the fingerprint. Fundamentally, this boils down to improving the signal to noise ratio (abbreviated SNR or S/N). As those skilled in the art will appreciate, signal-to-noise ratio is a measure used in science and engineering that compares the level of a desired signal to the level of background noise. It is defined as the ratio of signal power to the noise power, often expressed in decibels. While S/R is commonly quoted for electrical signals, it can be applied to any form of signal (such as isotope levels in an ice core or biochemical signaling between cells).

Figure 14:
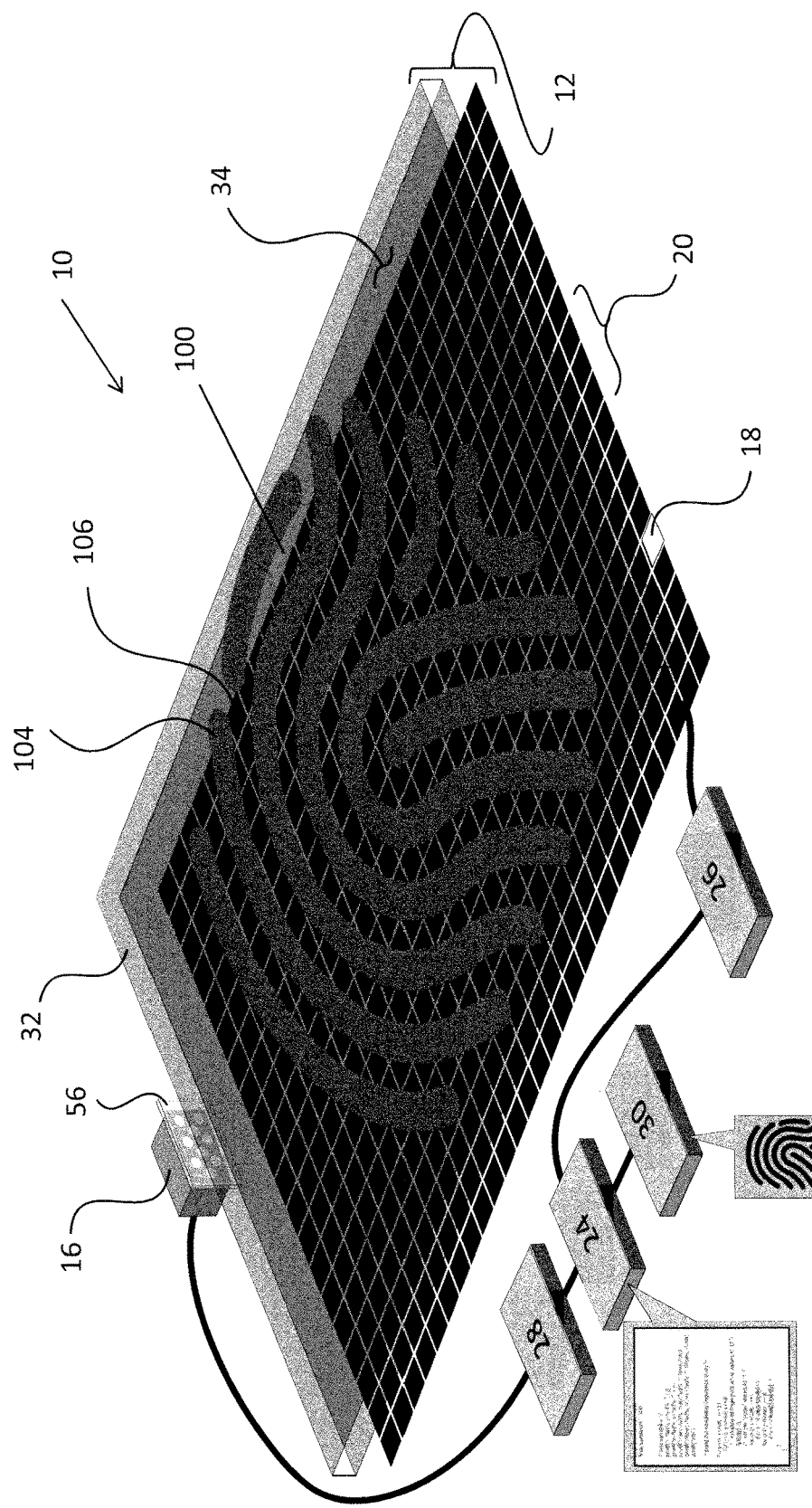
FIG. 14 is a schematic of an alternate embodiment of the present fingerprint reader.

In the case of the remote sensing fingerprint reader 10, S/N is a measure of the clarity of the fingerprint image as it is created pixel by pixel. Improvements to the S/N ratio can be achieved by increasing the relative strength of the signal over the noise as recorded at the photo-sensor 16. In the present case, the source of the signal energy is a light emitting pixel 16 or an array 20 of light emitting pixels 18 making up the display screen 12. Thus, the S/N ratio of the fingerprint image can be improved by adding more energy to the initial signal and also by encouraging more of the signal to reach the photo-sensor 16 that reads the signal. By reducing or eliminating random noise the image can be clarified. For instance, and with reference to FIG. 14, a filter 56 can be incorporated with the photo-sensor 16 to prevent unwanted energy from ambient noise or other sources from entering the photo-sensor 16. In the simulation section, significant ambient random noise is modelled, and several methods of minimizing noise are discussed below.

While it is appreciated all real measurements are disturbed by noise including, but not limited to, electronic noise and external events that affect the measured phenomenon (for example, wind, vibrations, variations of temperature, variations of humidity, etc.), the present remote sensing fingerprint reader 10 will likely be highly susceptible to ambient light.

The following describes signal collection methods and apparatuses improving the transmission of the signals, created by a remote sensing fingerprint reader 10 as described above, from the light emitting pixels 18 (or array 20 of light emitting pixels 18), that is, the source, to the photo-sensor 16, that is, the detector. In understanding this embodiment for improving the transmission of signals from the light emitting pixels 18 (or array 20 of light emitting pixels 18) to the photo-sensor 16 it is important to appreciate that the light emitting pixel array 20 provides an adjustable and movable (in discrete steps) source of illumination used to illuminate different areas of the fingerprint 100. Light from a light emitting pixel 18 is reflected differently if a light emitting pixel 18 is under a fingerprint friction ridge 104 or fingerprint valley 106. The transparent cover 34 acts as a medium to transfer the energy from the reflections to the photo-sensor 16. The light emitting pixels 18 are illuminated in sequence, and the remote sensing fingerprint reader 10 records the resultant varying energy pulses associated with each light emitting pixel 18 to construct a model or image of the fingerprint 100. A program 22 is required to record the energy pulses from the photo-sensor 16 and construct an image 52 (or model) of the fingerprint 100. In order to enhance the fingerprint image 52 to allow identification of minutia that can be used to identify the person associated with the fingerprint 100, the signal received by the photo-sensor 16 is improved without distorting the image by reducing the portion of the signal that is lost as the signal travels from the light emitting pixels 18 (or array 20 of light emitting pixels 18) to the photo-sensor(s) 16.

Figure 20:
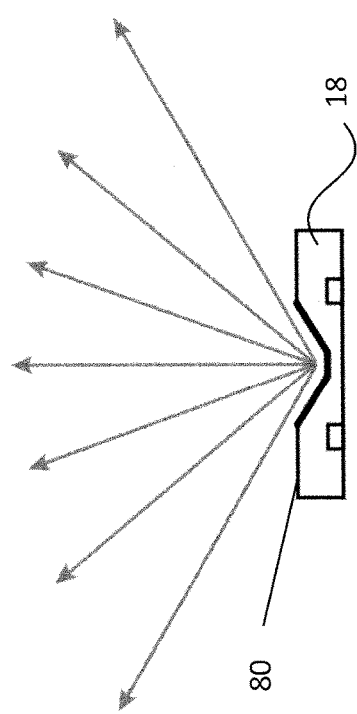
FIG. 20 is a schematic showing a light emitting pixel with a reflective surface along the substrate thereof for use in accordance with the present invention.

This is achieved in various ways. In accordance with one embodiment, and with reference to FIG. 20, a reflective pixel substrate 80 may be employed as a support for the array 20 of light emitting pixels 18. As a result, the space between sub-pixels of a light emitting pixel 18 can be reflective in the frequencies of interest. By reflecting the important energy back into the transmission medium rather than absorbing it in the substrate 80, more signal energy is available to enter the photo-photo-sensor 16.

Figure 15:
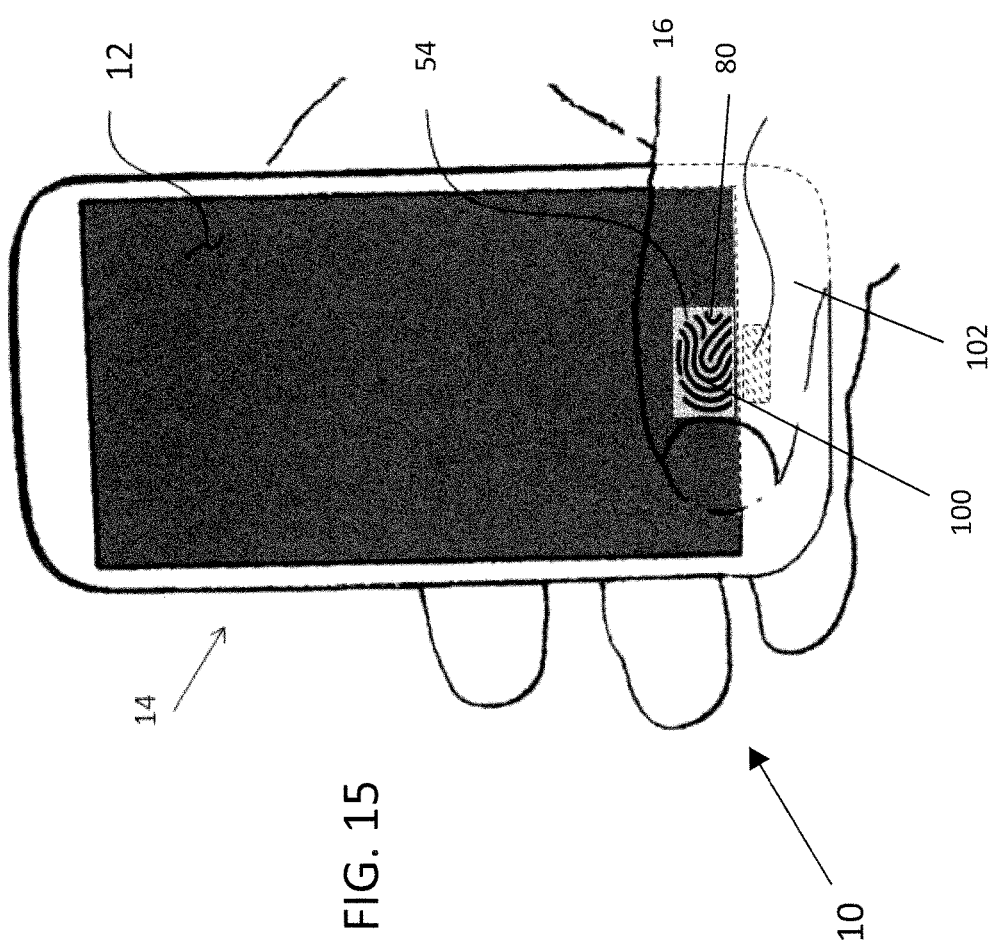
FIGS. 15 and 16 are views of a cellphone including alternate embodiments of the president fingerprint reader.
Figure 16:
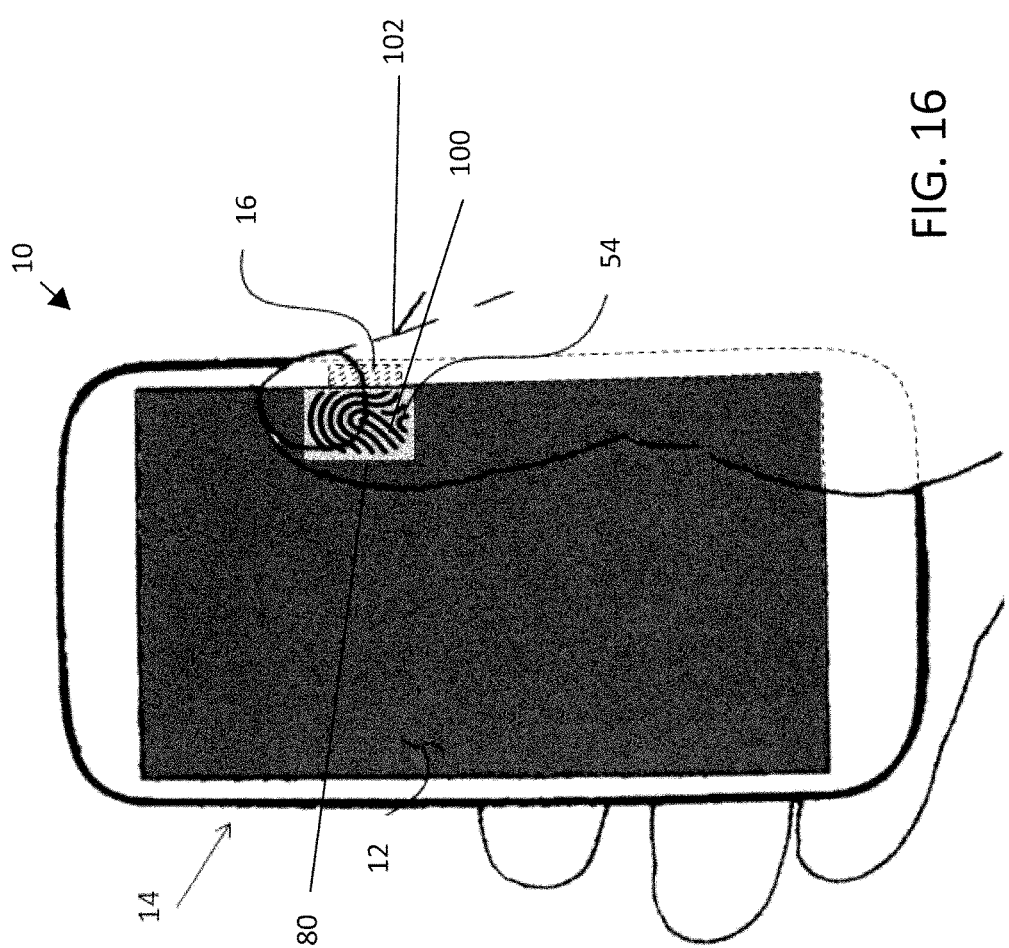

In accordance with another embodiment, and with reference to FIGS. 15 and 16, the photo-sensor 16 is positioned near the location to be used to sample the fingerprint. In accordance with such an embodiment, the remote sensing fingerprint reader 10 identifies a location on the display screen 12 that the finger should be placed, that is, the scanning area 54, and focus the fingerprint scanning on only that area. Rather than scanning potentially millions of pixels on the full display screen 12, by localizing the scan the remote sensing fingerprint reader 10 can focus the scan on only a few thousand light emitting pixels 18. The number of active energy emitting pixels 18 is minimized, and the data transmission requirements of the sensor and system are minimized. This increases the S/N, requires less sensor dynamic range, reduces power, reduces time, reduces computing requirements, etc.

The remote sensing fingerprint reader 10 directs the user to place the finger relatively near the photo-sensor(s) 16 to improve the fidelity of the signals. The signal differential between ridges 104 and valleys 106 will be strongest when the area of the display screen 12 being surveyed is near a photo-sensor 16. This may be critical in adverse conditions ere ambient noise is objectionably high. In this situation, the remote sensing fingerprint reader 10 can direct the user to preferentially place the finger 102 near the photo-sensor 16 to improve the clarity and strength of the signal. For instance, if the remote sensing fingerprint reader 10 is made with only one photo-sensor 16 near the right edge of the display screen 12 (see FIG. 16), then that photo-sensor 16 would be capable of detecting fingerprint ridges 104 and valleys 106 from a finger 102 placed anywhere on the display screen 12. However, the photo-sensor 16 will receive a stronger signal if the finger 102 is placed very near the right edge of the display screen 12. By directing the user to place the finger 102 near the edge of the display screen 12, or even half-on-half-off the edge of the display screen 12 (directly over the photo-sensor 16), the photo-sensor 16 will receive a stronger signal. That will allow the remote sensing fingerprint reader 10 to be made with photo-sensor(s) 16 that have a design or market advantage. For instance, the sensors may be less expensive or beneficial to the physical package (thinner, lighter, smaller, etc.). If the system directs the user to place the finger very near the edge of the display screen, or even partly off the edge of the display screen (partially over the sensor), the sensor will receive a stronger signal, and the finger will act as a shield against light near the sensor.

With this in mind, it is appreciated the remote sensing fingerprint reader 10 may fife equipped with multiple photo-sensors ensure there is a photo-sensor close to several different touch locations. For example, photo-sensors can be mounted on both the right and left sides of the display screen to more efficiently and conveniently accommodate right- and left-handed users. Placing photo-sensors on the top or bottom of the display screen may accommodate large or small hands or users who are accustomed to using a "home-button" for fingerprint recognition. With photo-photo-sensors on top and bottom edges of the display screen, efficient sensing locations are provided for devices that have no dedicated "top" or "bottom". The signal transmission efficiency may be improved by requiring the touch point to be near a corner where the finger can be placed near photo-sensors 16 on two adjacent edges. This may be particularly useful in situations where the illumination is polarized.

The using of multiple discrete photo-sensors around the perimeter of the transparent glass cover to simultaneously collect the reflected or re-radiated energy offers several opportunities for efficient collection of the energy compared to a single photo-sensor. Multiple photo-sensors can be used with a temporal filter to improve the S/N. If the finger is placed near one photo-sensor and far away from another, the photo-sensor nearer the finger will receive the signal first, and the opposing photo-sensor will receive a similar signal after some delay. Because the location of the finger relative to the photo-sensors is known by the remote sensing fingerprint reader, the timing of the signals arrival to the different photo-sensors can be accurately predicted. The characteristics of the signal (such as amplitude, frequency, dwell time) can be measured at each photo-sensor 16 and compared to a base line "signature" signal or the two signals can be compared to each other to additively amplify the signal and potentially cancel or ignore noise components that originate from sources other than the location of the finger.

It is also contemplated to add a continuous photo-sensor 16 around the perimeter of the transparent glass cover, for example, Thin Film Photovoltaic technology would be one way to implement such an embodiment. The relatively larger area achieved by the provision of a continuous photo-sensor 16 will collect more of the signal, and the opportunity to cover the entire perimeter will be sure not to miss any locally stronger signal energies exiting the transmission layer. Nearly all the energy from the illumination interaction will be collected.

It is also contemplated possible to create reflective surfaces selectively around the perimeter of the transmission layer to redirect signal energy back into the transmitting medium (that is, the light emitting pixel or pixel array) until the energy escapes toward the photo-sensor. This allows the photo-sensor 16 to capture signal energy that would otherwise be lost. There are multiple commercially available methods for creating a mirror surface on substrates that are transparent to wavelengths of interest; for example, applying a silver coating with bonding agents to help adhesion to the glass, and protective layers to resist oxidation and damage.

It is also contemplated one might add a photo-collector along the edges of the transparent glass cover to gather all energy to one or a few photo-sensors. This would be, essentially, a "light pipe" around the edges of the transmission plane, or even on the face of the transmission plane. All the energy coming to the edges or the face collector of the transparent glass cover would insert into the light pipe (or photo-collector) and travel to one or more remotely located photo-sensors.

It is also contemplated to use a full-sheet photo-sensor in or under the display screen. This differs from the previously described remote sensing fingerprint reader in that the photo-sensor is not located remotely at the perimeter. However, the basic principle of operation is the same—using the sequential illumination of the light emitting pixels to illuminate small parts of the fingerprint. Having the full area photo-sensor allows the remote sensing fingerprint reader to pick up the energy from the first reflection of the light emitting pixel.

Figure 17:
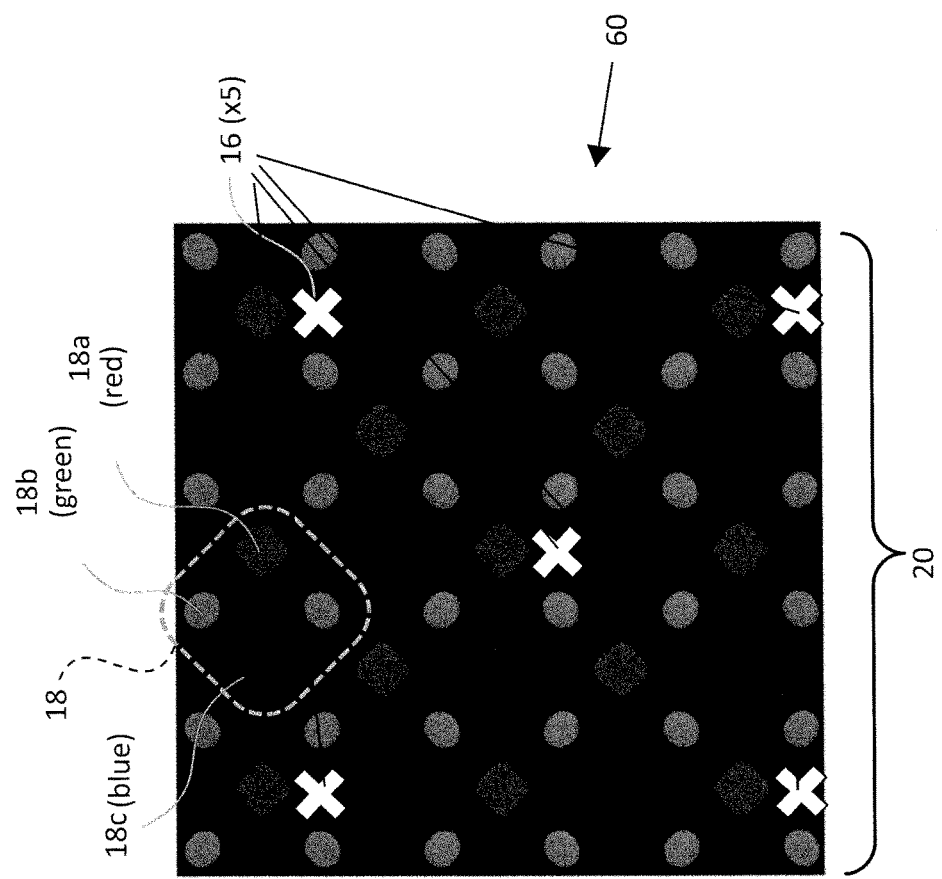
FIGS. 17 and 18 are schematics showing an arrangement of sub-pixels and photo-sensors in accordance with the present invention.
Figure 18:
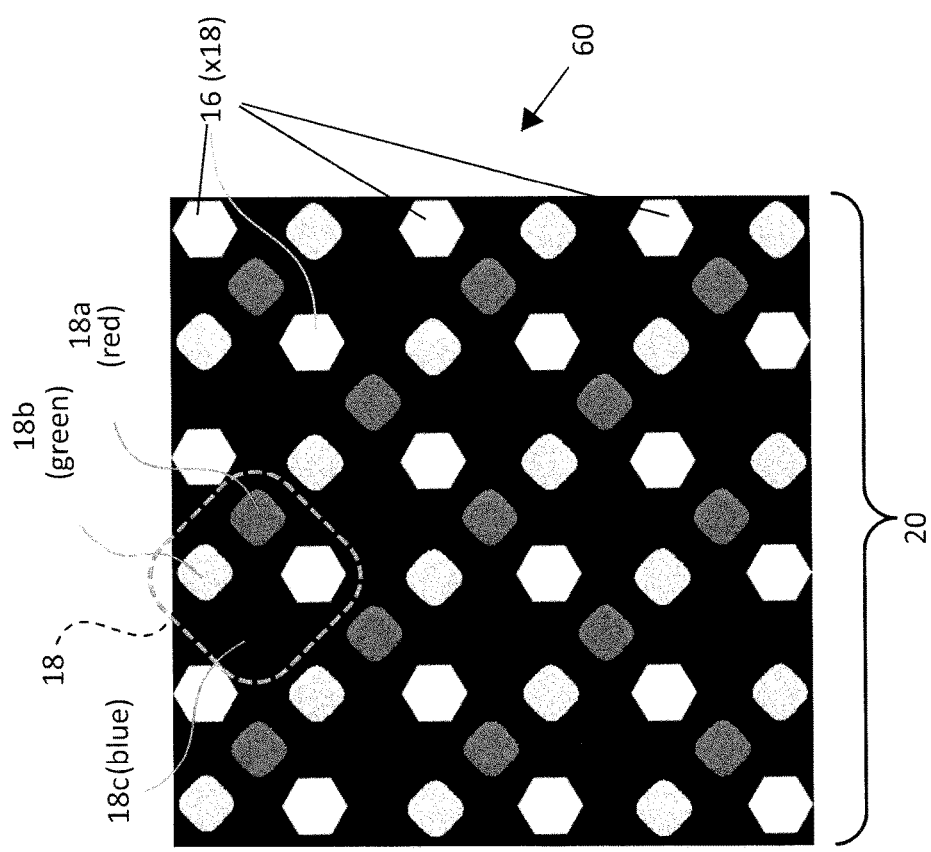
Figure 19:
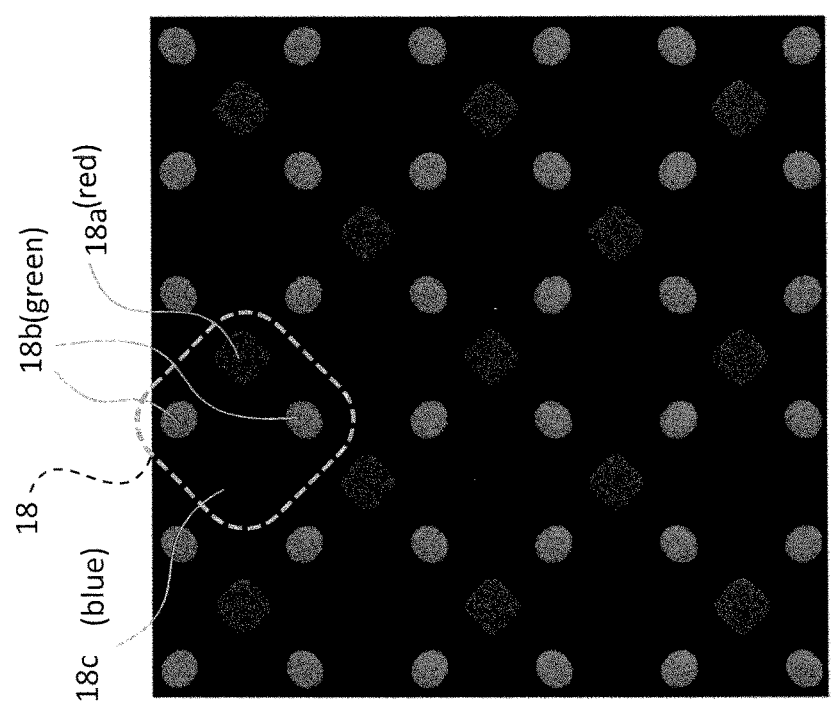
FIG. 19 is a schematic showing an array of sub-pixels in accordance with the present invention.

Still further, and similar to the embodiment described above, an array 60 of photo-sensors 16 can be placed under the display screen 12 or integrated into the display screen 12 (see FIGS. 17 and 18). There are other optical photo-sensors that attempt to take a fingerprint under the cover glass of a phone, watch or other display screen equipped device. One significant challenge is to create photo-sensors at 500 per inch resolution, and to train each photo-sensor 16 to observe energy only from directly above the photo-sensor 16—essentially a very narrow field of view. Bringing the photo-sensors 16 close to the surface demands that the glass be thin and that can compromise the robustness of the device. A popular option used by IDEX and other developers is to create lenses or channels to control the light dispersion. This can be achieved with advanced materials (clear substrates or IR transparent substrates for instance), but these steps induce compromises to other aspects of the display. None of these approaches have reached volume production—principally because of the compromises required in the design make large scale implementation impractical.

In the method of the present invention, by using the timing of the sequential illumination of the display pixels, the photo-sensor 16 array will preferentially detect the energy reflected, re-radiated from an area on the display screen 12 that is close to the "source" rather than close to the photo-sensor 16. This solves several key problems. It is no longer necessary to place the photo-sensor 16 close to the touch surface. The photo-sensor 16 array need not interfere with the visual performance of the display—the photo-sensor 16 can be in front of the active display screen, integrated into the display screen, or behind the display screen. Lensing can be used to focus the energy from the pixels, but no lensing or focusing is required for the photo-sensors—the photo-sensors need only to detect energy amplitude and/or frequency, not direction. Such an implementation would take advantage of the microprocessor 24 to perform the necessary calculations.

An array 60 of photo-sensors 16 spread across the area of the display screen 12 for a remote sensing fingerprint reader 10 has the advantage that the detection can be localized to isolate noise. That is, the remote sensing fingerprint reader 10 can record energy only from the photo-sensors 16 under or near the light emitting pixel 16 being used to illuminate a part of the finger. By the same rational the array of photo-photo-sensors 16 would increase the signal strength because the photo-sensors 16 are relatively close to the source illumination. Furthermore, it is not necessary to have a photo-sensor 16 associated with every pixel. Each photo-sensor 16 can monitor the activity of dozens, hundreds, or thousands of nearby pixels. If the photo-sensors 16 are placed in or around the light emitting pixel array 20, they must be protected from directly receiving light from the light emitting pixels 18. This can be as simple as positioning the photo-photo-sensors 16 where the light from light emitting pixels 18 cannot directly enter, or providing shielding between the illuminating light emitting pixels 18 and the photo-photo-sensor 16.

Signal Fidelity Enhancement

The light emitting pixel array 20 of the remote sensing fingerprint reader 10 provides an adjustable and movable (in discrete steps) source of illumination used to illuminate different areas of the fingerprint. Light from a light emitting pixel 18 is reflected differently if a light emitting pixel 18 is under a fingerprint friction ridge or fingerprint valley. The transparent cover 34 acts as a medium to transfer the energy from the reflections to the photo-sensor 16. The light emitting pixels 18 are illuminated in sequence, and the remote sensing fingerprint reader 10 records the resultant varying energy pulses associated with each light emitting pixel 18 to construct a model or image of the fingerprint. A program is required to record the energy pulses from the photo-sensor 16 construct all image or model of the fingerprint.

In order to enhance the fingerprint image to allow identification of minutia that can be used to identify the person associated with the fingerprint, the signal received by the photo-sensor 16 can be improved without distorting the image by increasing the signal strength and by improving the signal transmission. In accordance with one embodiment this is achieved through the provision of overdrive light emitting pixels 18. Some display drivers limit the light emitting pixel brightness to avoid damage to the light emitting pixel elements and materials. The potential for damage to the light emitting pixel may be time-dependent for some materials—that is, the higher energies are not detrimental if held for a short time. Overheating is a common example. In accordance with the remote sensing fingerprint reader 10, however, the pulse of a single light emitting pixel 18 can be much faster than human perception which would be an uncommon use for a visual display. This unusual use of the display screen 12 opens the possibility to allow much higher energy to be used safely (especially if turning on/off). Alternatively, within the display pixel array of the cellphone 14 or other device, and as briefly discussed above, a secondary set of light emitting pixels 70 can be interspersed amongst the primary light emitting pixels 18, 18a, 18b, 18c. The secondary set of light emitting pixels 70 are dedicated to the remote sensing fingerprint reader 10 and designed specifically to allow higher energies without excessive damage or degradation, while the primary light emitting pixels are charged with the display functions of the display screen 12 (see FIG. 23)). With the foregoing in mind, signal fidelity may be enhanced in a variety of ways will remaining within the spirit of the present invention. With the exception of those embodiments where additional figures the provided, these enhancements are achieved using calculation and processing performed by the microprocessor described 24 described above.

In accordance with such an embodiment, sequential AOI (Areas of Interest) refinement is performed to achieve the goals of the present invention. After a complete fingerprint area has been read and analyzed, the AOI can be identified—these might be light emitting pixels 18 expected to be under sedges or near ridge edges or near minutiae, for instance. The specific AOI will depend on the methods being used to identify features in the fingerprint. However they are defined, an additional scanning operation or operations can then be focused on only the light emitting pixels 18 (or sub-pixels) that are near the Areas of Interest (AOI). For instance, in the secondary scan, one option for refinement would be to illuminate only areas suspected to be near minutiae and re-analyze image to increase the clarity of the features in that specific area.

In accordance with another embodiment, Sequential Cluster Refinement is performed to achieve the goals of the present invention. In accordance with such a methodology, a "coarse" image in a first pass is created by illuminating groups of light emitting pixels 18 in a cluster or grid (e.g. 2×2, 3×3) to present a stronger signal the photo-sensor 16 at the sacrifice of a lower resolution. If a finer resolution is required, a second pass can be made with smaller clusters (and consequently a higher resolution), and a 3rd pass to further refine, and so forth. The secondary passes can be made selectively to focus on areas of interest.

Figure 22:
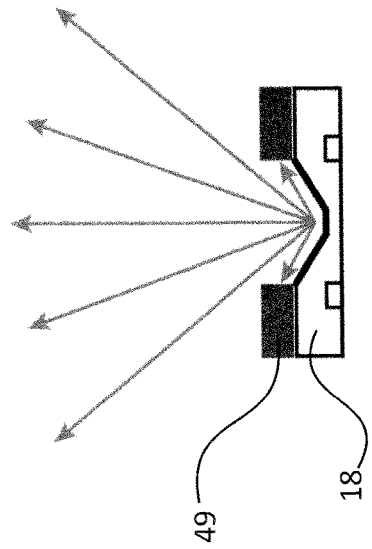
FIG. 22 is a schematic of a light emitting pixel with occlusion members for use in accordance with the present invention.
Figure 21:
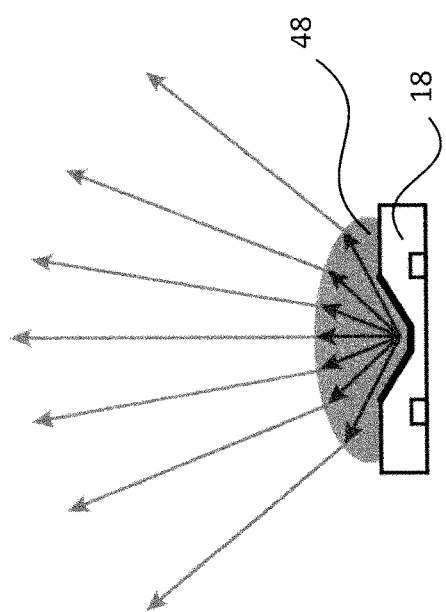
FIG. 21 is a schematic of a light emitting pixel showing a lens integrated therewith for use accordance with the present invention.
Figure 27:
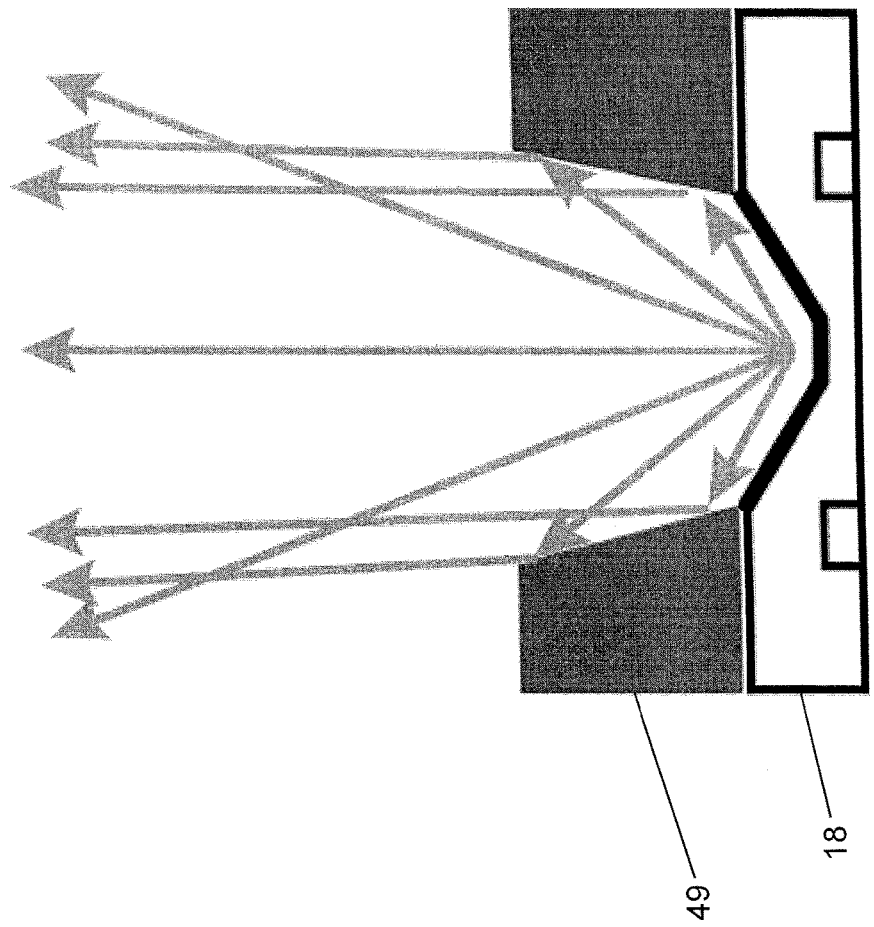
FIG. 27 is a schematic of a light emitting pixel with occlusion members for use in accordance with the present invention.

Still further, signal fidelity may be enhanced by illuminating each light emitting pixel 18 such that the illumination is focused onto a small area on the touch plane 35 (that is, the top surface 35 of the transparent cover 34 that is ultimately touched by a user of the present remote sensing fingerprint reader 10) above the array 20 of light emitting pixels 18. This will increase the amount of energy delivered to the specific point on the fingerprint that is being sampled (increase the signal energy) and reduce the energy being delivered to areas that are not under evaluation (decrease noise energy). The focusing technique is done in a way so that it quickly diverges after leaving the touch plane 35—thereby providing the user a wide viewing angle. Referring to FIG. 21, a simple implementation in a contemporary smartphone includes the introduce of micro-lenses 48 at each light emitting pixel 18 or group of light emitting pixels 18 that have a focal length approximately equivalent to the distance from the light emitting pixel 18 to the touch plan on the opposite side of the transparent glass cover 34 used as the transmission medium. With reference to FIGS. 22 and 27, control of the light may also be achieved by providing occlusion members 49 around the light emitting pixel 18. The occlusion members block energy that otherwise would be illuminating a larger area. Furthermore, the occlusion members can be made reflective and shaped to direct the extra energy toward the smaller target area on the touch plane 35.

To achieve a wider field of view in the display screen 12, the focal length can be designed to be slightly shorter than the distance to the touch plane 35. Non-optimal focusing of the may still provide a significant benefit to the energy efficiency in the area being sampled.

Signal fidelity may also be enhanced by concentrating the signal detection on changes in the colors that are preferably reflected from interaction with the fingerprint. For instance, in RGB color space, the flesh tones are typically higher in Red than in Green and Blue. Red is particularly dominant and may be 40% more than Blue or Green, though Blue and Green may differ by 5% or more. The remote sensing fingerprint reader 10 focuses on changes particularly in the Red part of the spectrum—knowing that the signal (and SNR) will be strongest in Red. To improve the fidelity even more, the remote sensing fingerprint reader 10 can locally and dynamically determine the optimal signal frequencies of interest by doing a first-pass scan and recording the average reflected color components of the fingerprint as it is placed on the touch plane 33. This calibration pass needs only to determine the average color in the area of interest (not at each light emitting pixel 18 of the illumination source). To make this measurement, the remote sensing fingerprint reader 10 can ensure all the light emitting pixels 18 in the area of interest are illuminated and measure the spectrum of the reflected and/or re-radiated energy. Further refinements can be made by estimating the likely fraction of light emitting pixels 18 in the scanning area that are reflecting/re-radiating ridges and the fraction that are reflecting/re-radiating fingerprint valleys and using this info to fine-tune the portion of the energy be used to construct the fingerprint.

Further still, the resolution of the sample area can be increased by using sub-pixels 18a, 18b, 18c. Referring to FIG. 17, each light emitting pixel 18 in a typical full-color display is comprised of sub-pixels, such as, red sub-pixel 18a, green sub-pixel 18b and blue sub-pixel 18c. When white light is used as a source, the location of the source can be assumed to be the center of the group of sub-pixels. Alternatively, a single color of sub-pixel can be turned on to give a slightly shifted image. In FIG. 17 each whole light emitting pixel 18 is made up of two green sub-pixels 18b (they illuminate together) with a red sub-pixel 18a and blue sub pixel 18c slightly below. The red and blue sub-pixels 18a, 18c alternate left and right. If one uses only the green sub-pixels 18b, the source x-y location, and therefore the image capture, will shift slightly up and to the left from the "white" image. If one uses red sub-pixels 18a, the x-y location of the source is slightly left and down on the top row and slightly right and down on the second row. For blue sub-pixels 18c, the x-y location of the source is slightly right and down on the top row and slightly left and down on the second row. The net result of a composite image taken with each color independently, and then aligned according to the known sub-pixel locations will have twice the overall resolution of the "white" image.

Figure 24:
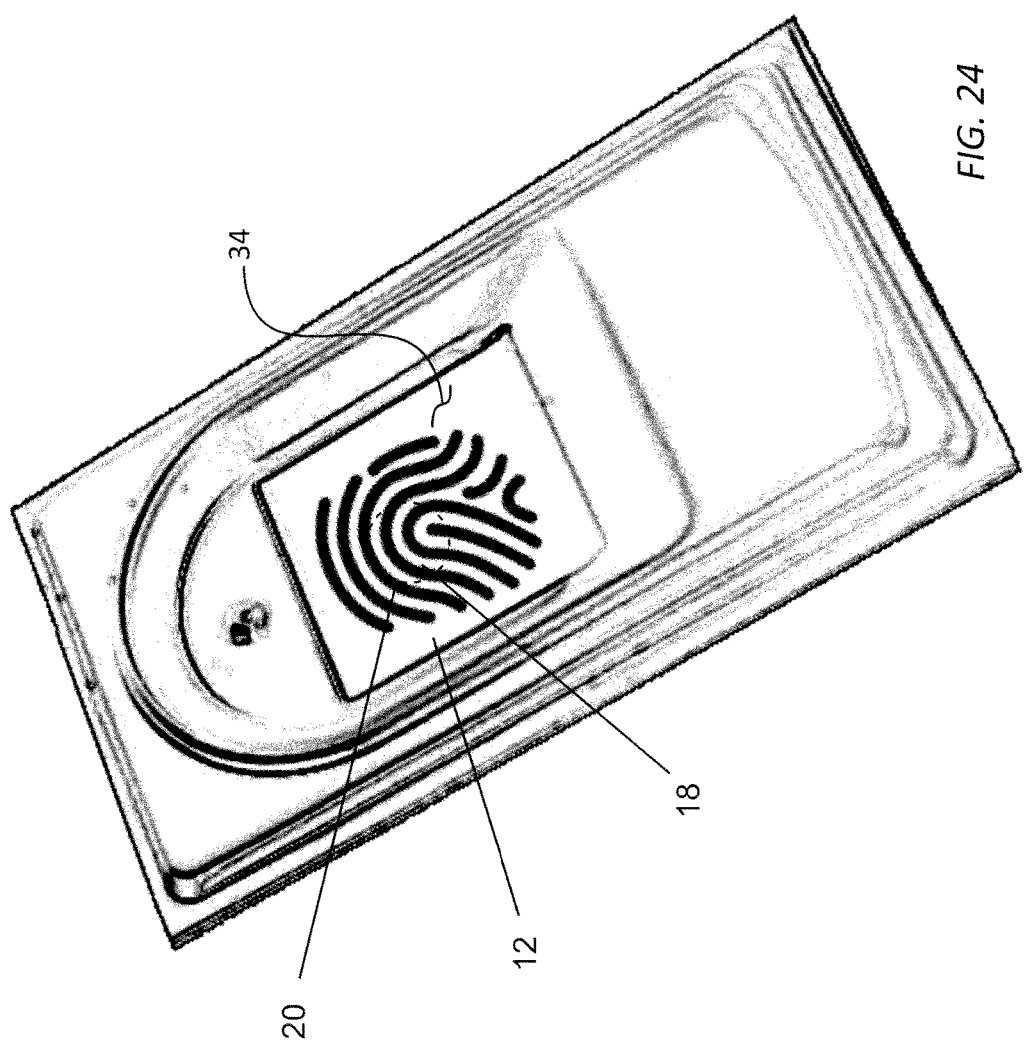
FIG. 24 is a perspective view of a fingerprint reader in accordance with an alternate embodiment.

In accordance with yet another embodiment, the area of interest can be divided into segments and each segment measured independently to improve the signal quality and potentially reduce the dynamic range requirement of the photo-sensors 16. Because the scanning rate is fast relative to human perception (typically 1/60th of a second for the full screen), and the fingerprint recognition rate requirement for humans is much longer (as much as a full second in some devices), the scanned area can be divided into several smaller, more manageable segments that can be scanned one at a time. Multiple smaller scans will reduce the dynamic range requirements of the photo-sensor 16 and reduce opportunities for noise to enter the system. For example: If the goal of the device is to collect a fingerprint model or image that is 4 mm×9 mm (@500 ppi)—that's roughly 14,000 light emitting pixel 18s. Under an accumulated illumination profile (where each light emitting pixel 18 is turned on and left "on" through the sensing process), the photo-sensor 16 must have the ability to detect at least 14,000 different energy levels. If the system can allow ½ sec for a full scan, then the device can divide the area to be scanned into 30 segments with each segment having, less than 500 light emitting pixels 18 in this case, the photo-sensor 16 needs only discern 500 different energy levels. That's 8-bits of precision compared to 14-bits required for the un-segmented case.

Where a special light emitting pixels (that is, secondary light emitting pixels) 70 are built into the display screen 12 specifically for the remote sensing fingerprint reader 10 as discussed above, and in addition to the light emitting pixels of the display screen 12 that are used for conventional display operations, the special light emitting Pixels 70 can be more optimally designed for the remote sensing fingerprint reader 10. Specifically, they can operate safely at higher energies to produce stronger signals. They can be narrowly focused to ensure only a small part of the finger is being illuminated. They can operate in a unique wavelength that is resistant to noise, or non disruptive to other performance goals, or convenient for any economic or functional reasons. There are various options for achieving such a construction, for example, the array of the special light emitting pixels 70 can co-exist with the light emitting pixels of the display screen 12 that are used for conventional display operations by being be built in the same materials and layers, the array of the special light emitting pixels 70 can be in a new layer above, below, or intermingled with the light emitting pixels of the display screen 12 that are used for conventional display operations, or the array of the special light emitting pixels 70 can be built completely separate from the display screen (that is, made as an independent device that operates with or without the presence of a display altogether). For example, and with reference to FIG. 24 a fingerprint reader is disclosed which does not function as a display but merely includes an array 20 of energy emitting pixels 18 below a transparent cover 34 of the screen 12.

Temporal Enhancement

In order to enhance the fingerprint image to allow identification of minutia that can be used to identify the person associated with the fingerprint, noise on the signal can be removed without distorting the image through the use of appropriate filters as disclosed below. With the exception of those embodiments where additional figures the provided, these enhancements are achieved using calculation and processing performed by the microprocessor described 24 described above.

In accordance with one embodiment, and with precise timing of the light emitting pixels 18 on the display screen 12, the equivalent of a lock-in amplifier can be created by filtering the signal based on the timing of the light from the light emitting pixel 18 and ignoring other incident energy that is not time-sequenced with the source illumination. To some extent this would address all sources of noise including ambient light.

Filtering may also be achieved through the use of over sampling techniques. In accordance with such an embodiment, the area of the display screen 12 to be scanned is scanned multiple times. The photo-sensor 16 monitors the signal continuously or intermittently during each sample period. Since the signal is periodic and the noise is random, it is possible to enhance the SNR by averaging the measurement. This is done by simply taking more than one image and combining them. Alternatively the on-time can be increased allowing more signal samples to be acquired. In this case the noise goes down as the square root of the number of averaged samples.

The remote sensing fingerprint reader 10 can observe ambient light physically near (but not under) the finger during the reading of the image, at or near the time of the fingerprint read, and filter, cancel, or compensate for the spectrum coming from ambient light incident on the display screen 12. One possibility for implementing such an embodiment is to repurpose a camera that is built into the device to monitor eternal ambient noise, in particular the portion of ambient light that resides in the narrow bands of the RGB light emitting pixels 18. The ambient light can be averaged or measured over time to filter cyclic noise—e.g. ambient light from electrical or electronic sources running at 60-cycle pulses.

Because the display screen 12 of many cellphones is made of RGB light emitting pixels 18 each of which produces a single color in a narrow bandwidth, the remote sensing fingerprint reader 10 can balance, cancel, or normalize the effects of ambient light by driving the RGB components in a complimentary fashion across the unused part of the display screen 12 effectively overwhelming random ambient noise with a background of known RGB components. Ambient light that does not match the narrow band RGB components of the induced background can be ignored.

Similarly, the color of the fingerprint's reflected energy can be monitored over time to detect life (differences in blood-flow/color). In this case, malicious counterfeit "fingerprints" are treated similarly to other forms of noise and eliminated or used to recognize a "chop" or other identification device other than a fingerprint.

A coating can also be applied to the top of the display screen that reflects a significant portion (if not all) ambient light. This prevents ambient light from entering the glass and reduces the noise reaching the photo-sensor 16. The reflective coating may also improve the internal reflections and increase the signal strength to the photo-sensor 16. If the reflective coating could be defeated by physical contact (so the ridges of the fingerprint will introduce a different reflection/re-radiation characteristic) the coating would increase the power ratio between a ridge and a valley in a fingerprint, increasing the signal power. The characteristic of being defeated by physical contact is not atypical of reflective coatings. Overall this results in a higher S/N. The reflective coating and sensing can operate in a non-visible part of the spectrum to minimize the impact on the regular use of the display device.

It is further appreciated that the application of reflective coatings has broader applications in the field. In a similar fingerprint reading device, specifically an IR reflective coating on the outer surface can reflect light away from the photo-sensor that is not desired in the image. For instance, in the "Hybrid" sensor from GingyTech, an IR coating on the top surface of the remote sensing fingerprint reader 10 will improve the fidelity of the analog signal to the CMOS sensor. This is true whether it be the transparent glass cover or the cover glass in an "underglass" application. If the top surface of the transparent cover is coated (or selectively coated) with IR reflective coating, then the contrast between the locations of the Frictions Ridge contact and the non-contacted areas will be accentuated. The reflective coating will reflect away a large percentage of the IR energy in the valleys where the friction ridges are not in contact with the coating. At the points of contact between the friction ridges and the reflective coating, the reflective properties of the coating are defeated, and the IR energy will come through to the CMOS sensor.

Still further, and still considering various coatings that might be used to enhance the operation of the remote sensing fingerprint reader, a light absorbing or occlusion layer can be added above the transparent glass cover to prevent ambient light from entering the transparent glass cover and adding noise to the system. Electrochromic glass has the advantage that it can be turned off under the location of the finger, preventing ambient light from entering the glass everywhere except under the finger so as not to interfere with the fingerprint signal. E-ink (microencapsulated electrophoretic display is another potential candidate to block external light. For the occlusion concept to be successful, a portion of the display screen must allow the fingerprint to change the internal reflective properties of the transmission glass as the light sources are sequentially illuminated under ridges and valleys. The reflectivity will change naturally in the occlusion layer by because of altered physical/optical phenomenon at the point of physical contact with the occlusion panel, but the changes may not be sufficient to create a strong signal. With generally continuous occlusion planes (like Electrochromics) it may be necessary to segment the display screen into regions that can be switched on or off separately, or to pre-define a specific region can be left "open" all the time to allow the fingerprint to be read at that location only. For normally re-configurable panels like E-ink, the complexity of the fully addressable display screen can be reduced to a few segments or quadrants, or a pre-defined open area can be the single location for reading a fingerprint. The occlusive properties of the e-ink or other occlusion layer can be modified to block only the frequencies not of interest to the remote sensing fingerprint reader operation.

Alternatively, a continuous occlusion layer (a coating that blocks most light) may be applied to the top surface of the display screen to prevent most of the ambient light penetrated into the display screen and increase noise. If the occlusion layer has high pass design for the narrow band RGB of the screen light emitting pixels (in other words, passes the single frequency red light and green light and blue light that is created by the light emitting pixels, but blocks all other light) it would have little if any effect on the display screen (allowing the RGB wavelengths through) but would prevent ambient light that outside of the RGB bandwidths. A significant component of ambient light consists of wavelengths that are outside of the RGB bandwidths.

Backlight modulation may also be used to achieve topical enhancement in accordance with the present invention. As is well appreciated by those skilled in the art LCD technology is widely used in displays. LCDs do not create light intrinsically, but rely on "backlights" to provide the illumination for the display. These backlights can be made by in several ways Light Emitting Diodes (LEDs), Electroluminescent panels (ELPs), cold cathode fluorescent lamps (CCFLs), etc. In the classic implementation, the backlight provides a continuous, evenly distributed illumination across the display panel in order to help create uniform, natural-looking images. Some technologies (LEDs in particular) are amenable to illuminating different parts of the display with different intensities and/or colors. This technology was developed to improve contrast. Because most LCD technology is not capable of blocking 100% of the light in the areas of a display that are supposed to be dark, the black areas would appear "gray". Also, some LCDs emit white light at a non-optimal color temperature—this can limit the color gamut that can be reproduced, and the colors can be perceived by humans differently in the presence of a different color temperature of the ambient light. Modern LED backlights are built with groups of discrete red/green/blue diodes whose energy can be modified dynamically to match the display intent and ambient surroundings. Many of these displays are designed so that different regions of the display can be made brighter or darker to match the content of the image being displayed. For instance, if an image is to be shown of a dark sky above a brightly lit town, the "town" area of the screen may be illuminated with normal LED backlighting brightness, while behind the "dark sky" of the image, the backlight illumination intensity may be significantly reduced to allow that part of the screen to appear very dark, or black.

In accordance with the present invention, the modulation can apply to the entire backlight, to regions, or to individual light emitting pixels. The S/N ratio may be further improved if the backlighting is turned completely off momentarily in regions not being used to sample the fingerprint. The off-cycle need only occur while the screen is driving the light emitting pixels 18 used to sample the fingerprint. The duration of off-cycle can be very quick (below human perception) or slower as necessary to optimize performance.

Turning off light-emitting pixels 18 after use is another way in which to provide for topical enhancements. If the display driver turns off each light emitting pixel 18 after a short duration, it allows the photo-sensor 16 to sample every light emitting 18 from a common, lower baseline energy state rather than accumulating incident light energy over time and measuring the change in energy as a result of the n+1 light emitting pixel 18 illumination. If single light emitting pixels 18 cannot practically be turned off sequentially within a screen refresh cycle, advantages still can be had by turning off light emitting pixels 18 in groups—e.g. one scan-line at a time. This is similar to the segmentation and clustering concept described above, but in this case, the clustering is performed within 1 refresh cycle.

Still further, an absorptive light emitting pixel substrate can be used in accordance with the remote sensing fingerprint reader. The substrate carrying the light emitting pixels is made to absorb ambient light or light produced by the remote sensing fingerprint reader that is not important to the fingerprint detection—specifically, energy known to be in unwanted parts of the spectrum. This may be achieved passively in the construction of the substrate, and it may be possible to actively alter the characteristics of the substrate during a fingerprint read. The substrate could contain electrochromic, e-ink, or other materials with changeable optical characteristics.

Signature Analysis might also be used in accordance with the remote sensing fingerprint reader 10. Specific characteristics of the signal (such as amplitude, frequency, dwell time) may be relatively constant and therefor create a predictable "signature" of a true signal. Signature Analysis is widely used in manufacturing, to monitor consistence in a process and ensure quality in finished products. Signatures or patterns also can be used to identify true signal data in the presence of noise. The information arriving at the photo-sensor 16 can be analyzed to look for the telltale characteristics of a light emitting pixel 18-driven data generated accordance with the present invention, or compared to a baseline "signature". The information is recorded for the fingerprint only when an appropriate signature is detected.

In accordance with another alternative embodiment, an array of micro-lenses could be placed above the illumination array of light emitting pixels to direct the light to the appropriate locations on the fingerprint. In that case, with proper lensing, the illumination array can be larger than the fingerprint so an illumination array with relatively coarse dots per inch (OPI) could be used and the illumination focused into a smaller area increasing the OPI of the system.

Key advantages of the present invention over prior art devices for full-screen fingerprint scanning, are this device does not require an array of sensors, and the array of emitters are already part of every smart-phone. Thus, with the addition of only a simple photo-sensor to the display screen 12 the entire display can be used as a fingerprint sensor.

As discussed above, there are many transactions performed where the security is less than desired. For example, most credit card transactions are performed with little security against fraud—with the number of times a credit card number needs to be canceled and re-issued testifying to how often fraud is committed. In addition to financial transaction secure entry is subject to security violations. The present remote sensing fingerprint reader 10 addresses concerns as credit cards are placed with cellphone transactions, because it can take a physically larger and more reliable fingerprint, makes sure that the device (cellphone) was activated by the person who's identification is in question—but it doesn't assure that the cell phone is actually in possession of the proper person—any more than a picture identification or credit card.

In additionally to fingerprint reading, the remote sensing fingerprint reader 10 is capable of detecting/measuring the color, contours, and profile of any object where it is in contact with a display screen 12. The remote sensing fingerprint reader 10 is, in its most basic form a means of detecting surface features and colors. As an authentication device, it can be used with other body parts that have unique shapes, textures, or colors (toes have toe-prints). It can be use with a custom "stamp" or signature. It would detect embossed features on flexible substrates like paper.

Figure 25:
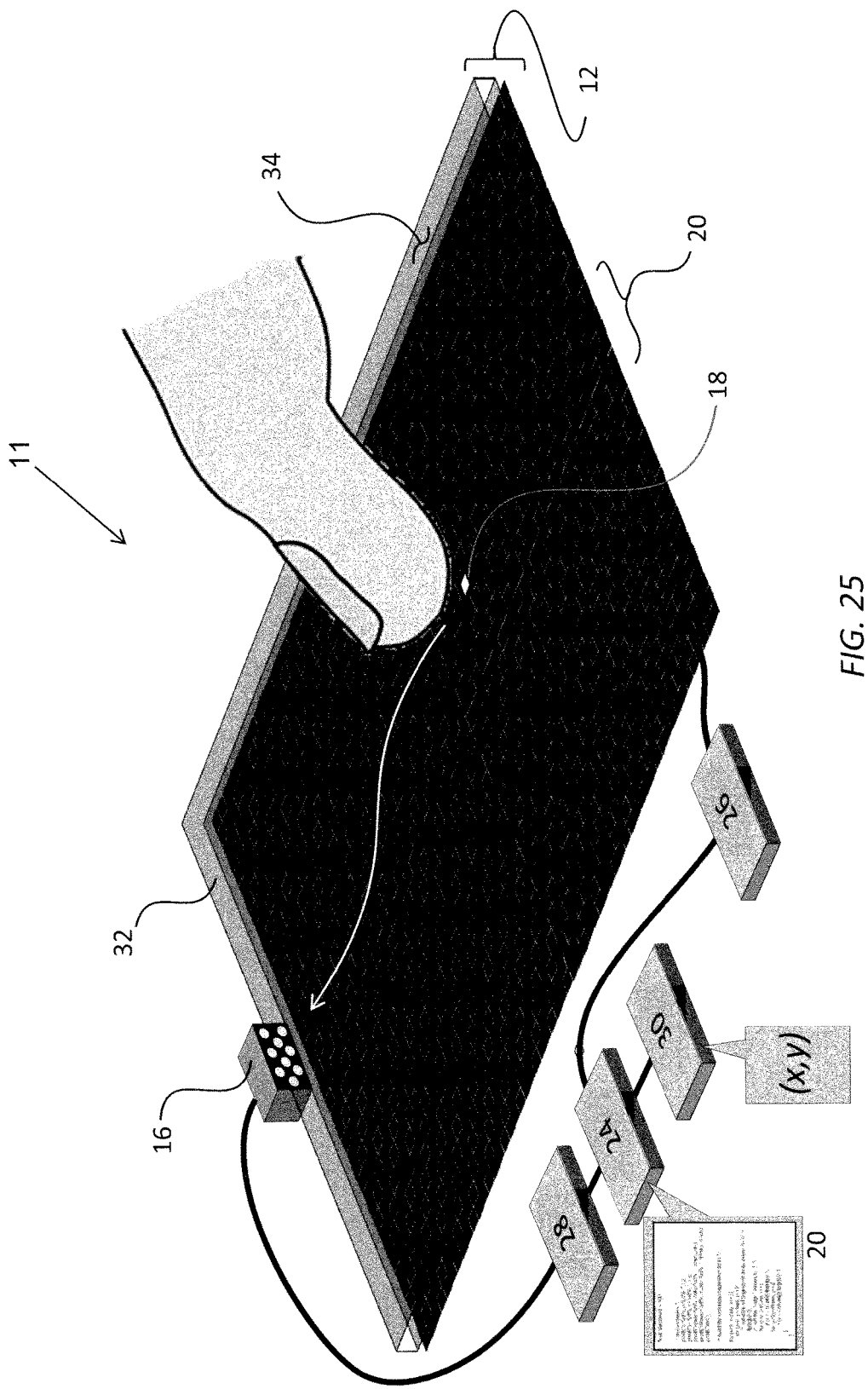
Figure 26:
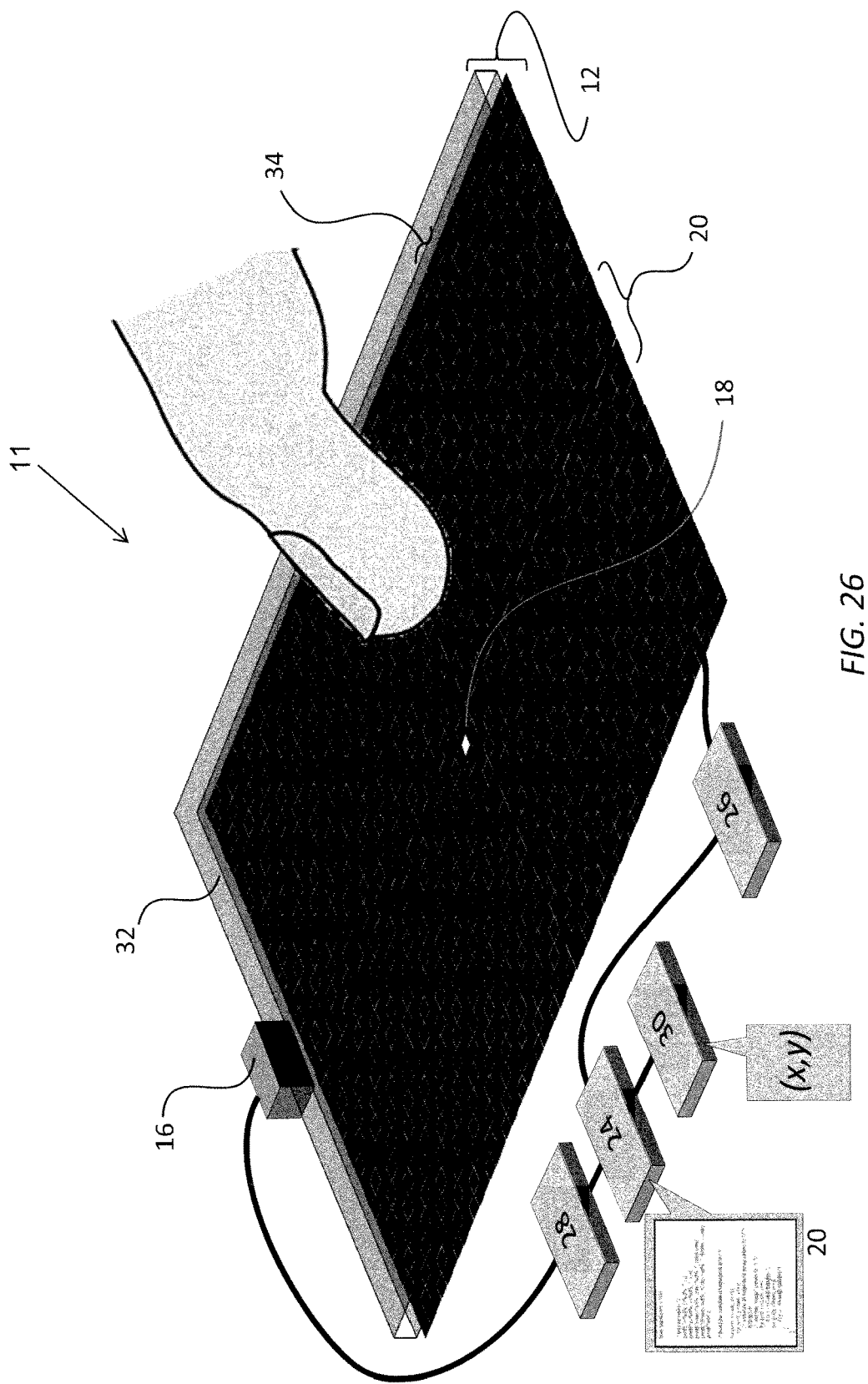

For instance, and with reference to FIGS. 25 and 26, it is possible to use the scanning system underlying the present invention to function as touch position reader 11 by detecting the position of an object touching the display screen 12 and therefore locate the position of anything (such as a finger) touching the transparent cover 34 of the display screen 12. This is achieved by monitoring the reflected energy received at the photo-sensors 16 at the edge 32 of the transparent cover 34 while scanning the entire display screen 12. The reflected energy received by the photo-sensor 16 from the light emitting pixels 18 of the array 20 that are under the finger (see FIG. 25) would be different from the reflected energy received from the light emitting pixels 18 elsewhere in the display screen 12 (see FIG. 26) which can be used to identify the location of the light emitting pixels 18 underneath the finger, and, consequently the location of the finger's touch point. Furthermore, this can be done during the normal operation of the display screen 12 without compromising visual operation of display screen 12. In addition, such a touch position reader 11 would use similar functional elements as described above with regard to remote sensing fingerprint reader 10, for example, A/D convert 28, microprocessor 24, memory 30 and driver 26. Alternatively, the operation would be essentially invisible to the user by operating the emitters near or beyond the limits of human perception—if the emitters are illuminated quickly or if the system uses non-visible sources such as IR. IR can be emitted from special light emitting pixels 18 integrated into the display, or from another layer in the display stack. Hiding the scan in the time domain is naturally achieved if the scanning cycle is fast and/or the scanning is done in a non-accumulating manner that is, the light emitting pixels 18 are switched off (or back to the desired display color) after use as a source for the remote sensing fingerprint reader 10.

Additionally, the scanning system will be able to detect the profile of objects other than fingerprints. These can be other tactile biometric indicators (palm prints, etc.) or deliberately made "keys".

The system can be made to be sensitive to the color of the object touching the screen. This can further expand the applications of the screen-scan operation to detect colored objects and/or allow additional discrimination of biometric data (such as the color of skin).

With the ability to detect color, and the rapid scan rate, it is possible to detect heartbeat through the subtle changes in reflected and re-radiated color in the fingerprint with each heartbeat. This may be accomplished during the fingerprint detection process or in an additional color-sensitive scan after the fingerprint has been verified. In a dedicated scan, the heartbeat may be measured through the net reflections and re-radiation over a larger area to enhance the signal strength. This can be used as a "stand-alone" detector of life. For a device such as a smart watch or FitBit health device the display screen on the device is large enough for remote sensing fingerprint reader 10 while also measuring the wearer's pulse independent from the remote sensing fingerprint reader 10. Thus remote sensing fingerprint reader 10 can detect the pulse of the fingerprint and match it in beat and phase to the pulse of the person who is wearing the device. Additionally, the pulse can be continuously monitored to assure that the device was not removed and replaced on another person thus assuring that the person identified by the device is, in fact, the person presently wearing the device. This is a much greater degree of security for financial or entry transactions than is presently available be any other means.

Having the ability to read a fingerprint anywhere on the display screen 12 opens up the opportunity for several application programs or apps that are not presently available. The operation of the display screen 12 is not presently optimized for reading a fingerprint. The remote sensing fingerprint reader 10 operation is typically controlled by a separate chip that is accessible by software—so the area where the finger is touching the screen can be scanned at intensities, colors and scan rates that are optimized for reading a fingerprint, and different from those used for display. In less optimal conditions, bright ambient light for example, an application can direct the user to place the finger on a location that is optimized for fingerprint reading to improve the functionality of the remote sensing fingerprint reader 10. In addition, when a fingerprint read is desired an app could be written that illuminates an area around the area optimized for reading the fingerprint, drawing the user to place the finger on the location that is optimized for fingerprint reading. After the fingerprint is read the area can be released back to be used for display.

Apps for preparing the screen to read a fingerprint can thus control where the finger is placed on the screen and can use the remaining screen for operations that will use the fingerprint for identification. Examples of operations that use a fingerprint identification are financial transactions such as Apple Wallet and similar credit card applications. When the fingerprint is read, the unused screen can be used to display a transaction code, such as a bar code, that is only used for one transaction (is only good for a limited time, for example 30 seconds) increasing security for purchasing transactions. Apps written to use the device screen as a fingerprint reader in order to enhance security in transactions requiring operator identification would be covered under this invention.

Examples of such apps would be, in addition to financial transactions, physical security operations such as access control systems (replacing identification card swipe systems with cellphone 14 reader or Blue Tooth enabled systems, or replacing garage door openers with cellphones). The cellphone 14 may become the key that operates a person's car or opens the house or starts the air conditioning or opens the gun safe. When coupled with a cellphone 14, secure operations can be performed remotely (from another continent). Blue Tooth enabled operations can be performed at a convenient distance, opening doors as they are approached once the cellphone 14 verifies the identity of the person holding it.

Apps allowing the cellphone 14 to replace the identification swipe card for personal identification for secure installations will require fingerprint sensors that can meet the FBI requirements specified in NIST SP800-76 (PIV) which can only be accomplished with fingerprint sensing areas that are much larger (12.8 mm×16.5 mm) than sensors presently in use on the front face of cellphone 14s. Only rear mounted sensors (which are unpopular with users) and full screen sensing as described in this patent can meet the FBI requirements. Once identification reliability for fingerprint sensors on a cellphone 14 reaches this level the cellphone 14 can be used for other secure operations, such as identification tokens used by banking institutions for financial transactions.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A fingerprint reader, comprising:
   a display screen composed of an array of energy emitting pixels covered by a transparent cover;
   at least one sensor coupled along an edge of the display screen;
   a display driver directing the array of energy emitting pixels of the display screen to illuminate in a sequence;
   a microprocessor in communication with the display driver and the at least one sensor, wherein the microprocessor knows the location of the energy emitting pixel being illuminated and the specific time at which the illumination occurs;
   wherein when at least one finger is placed on the transparent cover and the display driver is activated, energy from each energy emitting pixel sequentially illuminated is reflected off the finger to the at least one sensor, the energy received at the at least one sensor is at different intensity levels depending upon the ridges and valleys of the at least one finger, the at least one sensor sends a signal to the microprocessor regarding the energy intensity level, from which the microprocessor creates a fingerprint image as the energy emitting pixels are sequentially illuminated and further, wherein the energy received at the at least one sensor is filtered based on the timing of light received at the at least one sensor from the illuminated energy emitting pixel to prevent unwanted energy from entering the at least one sensor.

* * * * *